(12) United States Patent
Miyauchi et al.

(10) Patent No.: US 11,477,336 B2
(45) Date of Patent: Oct. 18, 2022

(54) IMAGE READER

(71) Applicant: SEIKO EPSON CORPORATION, Tokyo (JP)

(72) Inventors: Keisuke Miyauchi, Matsumoto (JP); Akifumi Sugano, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/388,414

(22) Filed: Jul. 29, 2021

(65) Prior Publication Data

US 2022/0038591 A1 Feb. 3, 2022

(30) Foreign Application Priority Data

Jul. 30, 2020 (JP) .............................. JP2020-129379

(51) Int. Cl.
*H04N 1/00* (2006.01)
*H04N 1/12* (2006.01)

(52) U.S. Cl.
CPC ..... *H04N 1/00602* (2013.01); *H04N 1/00557* (2013.01); *H04N 1/00612* (2013.01); *H04N 1/121* (2013.01)

(58) Field of Classification Search
CPC ..... H01L 21/28587; H01L 2224/48091; H01L 2224/49175; H01L 23/4824; H01L 24/06; H01L 29/42316; H01L 29/66863; H01L 29/812; H01L 2924/12032; H01L 2924/1306; H01L 2924/14; H01L 2924/15787; H01L 2924/3011; H01L 2924/00; H01L 2924/00014; H01L 29/80; H04N 1/00533; H04N 1/00535; H04N 1/00557; H04N 1/00602; H04N 1/00612; H04N 1/121
USPC ........................................................ 358/400
See application file for complete search history.

(56) References Cited

U.S. PATENT DOCUMENTS

| 10,858,208 | B2 * | 12/2020 | Hayashi ................. B65H 29/58 |
| 2003/0063337 | A1 | 4/2003 | Shirai et al. |
| 2014/0211277 | A1 * | 7/2014 | Ozaki ................ H04N 1/00588 358/496 |
| 2019/0132455 | A1 * | 5/2019 | Miyauchi ............. H04N 1/0066 |
| 2019/0132464 | A1 * | 5/2019 | Miyauchi ........... H04N 1/00602 |

(Continued)

FOREIGN PATENT DOCUMENTS

| JP | 2003176052 A | 6/2003 |
| JP | 2019083428 A | 5/2019 |

(Continued)

*Primary Examiner* — Negussie Worku
(74) *Attorney, Agent, or Firm* — Chip Law Group

(57) ABSTRACT

An image reader includes a curvature forming unit that contacts a medium upstream of a nip position between a feeding roller and a separating roller, and forms a curvature of the medium in a width direction that intersects a feeding direction. The curvature forming unit is capable of switching between a first state in which a curvature is formed in a medium and a second state positioned in a direction that is retracted from a feeding path of the medium compared to the first state. The curvature forming unit is associated with posture switching of the device body, and is brought to the second state when the device body takes a first device posture, and is brought to the first state when the device body takes the second device posture.

10 Claims, 19 Drawing Sheets

(56) References Cited

U.S. PATENT DOCUMENTS

2019/0297215 A1    9/2019  Miyauchi
2021/0155439 A1*  5/2021  Namiki .................. B65H 43/00
2021/0329141 A1*  10/2021  Miyauchi ........... H04N 1/00628

FOREIGN PATENT DOCUMENTS

| | | |
|---|---|---|
| JP | 2019083429 A | 5/2019 |
| JP | 2019165362 A | 9/2019 |

* cited by examiner

| DEVICE BODY POSTURE | SWITCHING LEVER | CURVATURE FORMING UNIT | SEPARATING MOTOR DRIVING POWER | SEPARATING ROLLER PRESSING FORCE | SEPARATING MOTOR SPEED |
|---|---|---|---|---|---|
| FIRST DEVICE POSTURE (INCLINED) | SEPARATION POSITION | SECOND STATE (UP) | TRANSMISSION | FIRST PRESSING FORCE (STANDARD) | FIRST DRIVE SPEED (STANDARD) |
| FIRST DEVICE POSTURE (INCLINED) | NON-SEPARATION POSITION | SECOND STATE (UP) | NON-TRANSMISSION | FIRST PRESSING FORCE (STANDARD) | — |
| SECOND DEVICE POSTURE (HORIZONTAL) | SEPARATION POSITION | FIRST STATE (DOWN) | TRANSMISSION | SECOND PRESSING FORCE (SMALL) | SECOND DRIVE SPEED (SLOW) |
| SECOND DEVICE POSTURE (HORIZONTAL) | NON-SEPARATION POSITION | SECOND STATE (UP) | NON-TRANSMISSION | FIRST PRESSING FORCE (STANDARD) | — |

FIG. 19

IMAGE READER

The present application is based on, and claims priority from JP Application Serial Number 2020-129379, filed Jul. 30, 2020, the disclosure of which is hereby incorporated by reference herein in its entirety.

BACKGROUND

1. Technical Field

The present disclosure relates to an image reader provided with a reading means configured to read a medium.

2. Related Art

In a scanner, which is an example of an image reader, a method may be adopted, as a medium separating method, in which a medium is nipped by a separating roller that is applied with rotational resistance, or torque in a reverse direction, and a feeding roller that rotates in a direction in which the medium is fed, to separate the medium. JP 2003-176052 A discloses an image scanner provided with a manuscript transport device that employs such a separation method.

For a feeding device, a method may be employed for contacting, among a plurality of media placed on a medium placement unit, the lowest medium or the bottommost medium, to send out the medium. Hereinafter, the lowest medium to be sent out is referred to as a leading medium, and a medium above the leading medium is referred to as a subsequent medium.

When the leading medium is sent out, due to friction force between the leading medium and the subsequent medium, the subsequent medium is also about to be sent out. At this time, a leading end of the subsequent medium is held back by a separating roller, but when rigidity of the subsequent medium is low, that leading end deflects along a feeding direction upstream of a nip position between the separating roller and a feeding roller, which may cause a jam later.

It is difficult to solve the problem described above, thus it is desirable to employ a plurality of means for solving the problem described above from the perspective of reliability of the problem solution, however, an increase in user operations for that is not desirable from the perspective of usability of the device.

SUMMARY

An image reader of the present disclosure for solving the above-described problem includes a medium placement unit on which a medium is placed, a feeding roller configured to contact a surface facing the medium placement unit of the medium placed on the medium placement unit, and rotate, to feed the medium, a separating roller provided at a position facing the feeding roller, and configured to nip the medium together with the feeding roller, and a reading means configured to read the medium fed by the feeding roller, wherein a curvature forming unit configured to contact the medium upstream of a nip position between the feeding roller and the separating roller in a feeding direction of the medium, and to form a curvature in the medium along a width direction intersecting the feeding direction is provided, the curvature forming unit is capable of switching between a first state for forming the curvature in the medium, and a second state positioned in a direction retracted from a feeding path of the medium compared to the first state, a device body including the medium placement unit, the feeding roller, the separating roller, the reading means, and the curvature forming unit is capable of switching between a first device posture, and a second device posture in which a posture of the medium placement unit is closer to horizontal compared to the first device posture, and the curvature forming unit is associated with posture switching of the device body, is in the second state when the device body takes the first device posture, and is in the first state when the device body takes the second device posture.

BRIEF DESCRIPTION OF THE DRAWINGS

FIG. 19 is a diagram illustrating contents of separation conditions.

DESCRIPTION OF EXEMPLARY EMBODIMENTS

Figure 1:
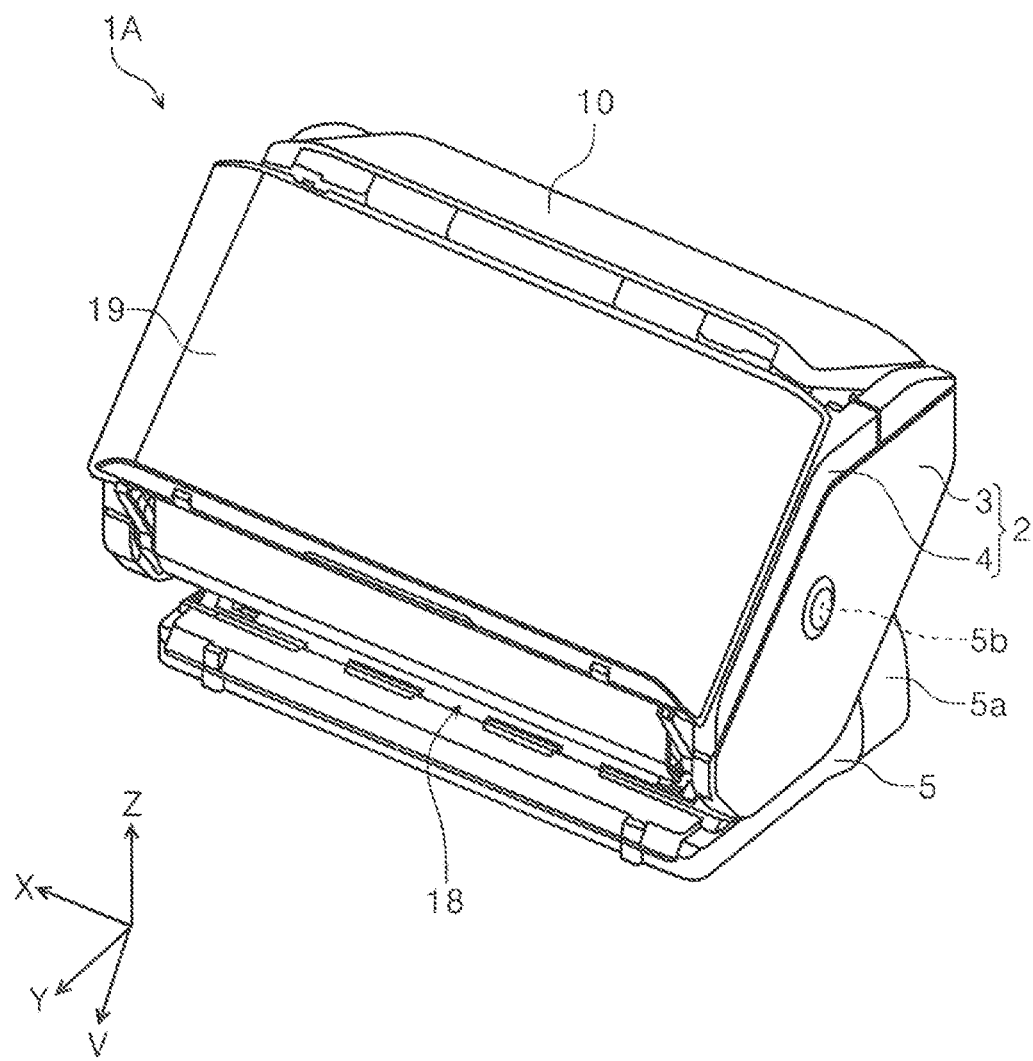
FIG. 1 is an external perspective view of a scanner viewed from a front, with a device body in a first device posture.

Hereinafter, the present disclosure will be schematically described.

An image reader according to a first aspect includes a medium placement unit on which a medium is placed, a feeding roller configured to contact a surface facing the medium placement unit of the medium placed on the medium placement unit, and rotate, to feed the medium, a separating roller provided at a position facing the feeding roller, and configured to nip the medium together with the feeding roller, and a reading means configured to read the medium fed by the feeding roller, wherein a curvature forming unit configured to contact the medium upstream of a nip position between the feeding roller and the separating roller in a feeding direction of the medium, and to form a curvature in the medium along a width direction intersecting the feeding direction is provided, the curvature forming unit is capable of switching between a first state for forming the curvature in the medium, and a second state positioned in a direction retracted from a feeding path of the medium compared to the first state, a device body including the medium placement unit, the feeding roller, the separating roller, the reading means, and the curvature forming unit is capable of switching between a first device posture, and a second device posture in which a posture of the medium placement unit is closer to horizontal compared to the first device posture, and the curvature forming unit is associated with posture switching of the device body, is in the second state when the device body takes the first device posture, and is in the first state when the device body takes the second device posture.

According to the present aspect, when the curvature forming unit is in the first state, a curvature along the width direction is formed at a leading end of a subsequent medium, thereby increasing rigidity in the feeding direction. The device body is capable of switching between the first device posture and the second posture in which a posture of the medium placement unit is closer to horizontal compared to the first device posture, thus bringing the device body into the second device posture makes it difficult for own weight of the medium to act on a leading end region of the medium, and the leading end of the subsequent medium is less likely to deflect.

By employing the plurality of means, that is, the curvature forming unit and the device body capable of performing the posture switching as described above, it is possible to effectively suppress deflection of the leading end of the subsequent medium along the feeding direction upstream the nip position between the separating roller and the feeding roller, and thus a jam can be effectively suppressed.

Furthermore, the curvature forming unit switches the state in association with the posture switching of the device body, so it is not necessary for a user to separately perform the state switching of the curvature forming unit and the posture switching of the device body, thereby improving usability of the device.

In a second aspect, in the first aspect, the curvature forming unit is capable of engaging with a fixed portion that maintains a fixed state independent of the posture switching of the device body, and the curvature forming unit changes the engagement with the fixed portion in accordance with the posture switching of the device body, and thus the curvature forming unit switches between the first state and the second state.

According to the present aspect, the configuration is adopted in which, the curvature forming unit is capable of engaging with the fixed portion that maintains the fixed state independent of the posture switching of the device body, and the curvature forming unit changes the engagement with the fixed portion in accordance with the posture switching of the device body, and thus the curvature forming unit switches between the first state and the second state, thus state switching of the curvature forming unit can be performed without using a power source such as a motor, thereby suppressing an increase in cost.

Note that, the engagement between the curvature forming unit and the fixed portion is not limited to a form in which the curvature forming unit is directly engaged with the fixed portion, but also includes a form in which the curvature forming unit is indirectly engaged with the fixed portion via another member.

In a third aspect, in the second aspect, the curvature forming unit is provided at a rotatable rotary member, and is configured to switch between the first state and the second state by the rotary member rotating, and the rotary member changes the engagement with the fixed portion in accordance with the posture switching of the device body, and thus the rotary member rotates.

According to the present aspect, the curvature forming unit can easily perform the state switching by the rotation of the rotary member.

In a fourth aspect, in the second aspect, the curvature forming unit is provided at a rotatable rotary member, and is configured to switch between the first state and the second state by the rotary member rotating, and the rotary member includes a first toothed gear portion around a center of a rotary shaft, the fixed portion includes a second toothed gear portion that meshes with the first toothed gear portion, the first toothed gear portion rotates while moving around the second toothed gear portion in accordance with the posture switching of the device body, and thus the rotary member rotates.

According to the present aspect, the curvature forming unit can easily perform the state switching by the rotation of the rotary member. Further, the configuration is adopted in which, the rotary member includes the first toothed gear portion around the center of the rotary shaft, and the fixed portion includes the second toothed gear portion that meshes with the first toothed gear portion, the first toothed gear portion rotates while moving around the second toothed gear portion in accordance with the posture switching of the device body, and thus the rotary member rotates, and thus, a configuration in which the rotary member is rotated can be easily realized.

A fifth aspect, in the third or fourth aspect, includes a detecting means for detecting rotation of the rotary member, and the detecting means detects rotation of the rotary member to detect a posture of the device body.

According to the present aspect, the configuration is adopted in which rotation of the rotary member is detected to detect the posture of the device body, so it is possible to detect the posture of the device body at low cost with simple structure.

In a sixth aspect, in the second aspect, the device body is provided with a plurality of detectors for detecting the fixed portion, and any of the plurality of detectors detects the fixed portion in accordance with posture switching of the device body, to detect a posture of the device body.

According to the present aspect, the configuration is adopted in which, the device body is provided with the plurality of detectors for detecting the fixed portion, and any of the plurality of detectors detects the fixed portion in accordance with the posture switching of the device body to detect the posture of the device body, and thus the posture of the device body can be detected at low cost with simple structure.

In a seventh aspect, in the first aspect, the curvature forming unit is provided at a rotatable rotary member, and is configured to switch between the first state and the second state by the rotary member rotating, and includes a discharge tray for receiving a medium that is read by the reading means and that is discharged, the discharge tray is rotatably provided with respect to the device body, and is associated with a posture change of the device body, takes a first medium supporting posture when the device body takes the first device posture, and takes a second medium supporting posture when the device body takes the second device posture, and the rotary member is provided so as to be rotatable in association with rotation of the discharge tray.

According to the present aspect, the discharge tray rotates in association with the posture change of the device body, and the rotary member is provided so as to be rotatable in association with rotation of the discharge tray, thus, state switching of the curvature forming unit can be performed without using a power source such as a motor, and an increase in cost of the device can be suppressed.

In an eighth aspect, in the first aspect, the curvature forming unit receives power from a power source to switch between the first state and the second state.

According to the present aspect, the curvature forming unit switches between the first state and the second state by receiving power from the power source, so a degree of freedom of state switching of the curvature forming unit is improved.

A ninth aspect, in any one of the first to eighth aspects, is provided with a display unit for displaying information, and in association with posture switching of the device body, information related to a state of the curvature forming unit is displayed on the display unit.

According to the present aspect, in association with a posture switching of the device body, information related to the state of the curvature forming unit is displayed on the display unit, so usability is improved.

The present disclosure will be specifically described below.

In the following, as an example of an image reader, a scanner 1A that is capable of reading at least one surface of a front surface and a back surface of a manuscript, which is an example of a medium, will be described as an example. The scanner 1A is a so-called document scanner that performs reading while moving a manuscript relative to a reading means.

Note that, in an X-Y-Z coordinate system illustrated in each figure, an X-axis direction is a device width direction, and is also a manuscript width direction. A Y-axis direction is a device depth direction, and is a direction along a horizontal direction. A Z-axis direction is a direction along a vertical direction. Furthermore, a V-axis direction is a manuscript feeding direction, and is a direction parallel to a manuscript transport path T described below, and respective angles formed with the Y-axis direction and the Z-axis direction change in particular, depending on a posture of the device.

In the present exemplary embodiment, a +Y direction is a direction from a back surface toward a front surface of the device, and a −Y direction is a direction from the front surface toward the back surface of the device. Also, a left is a +X direction and a right is a −X direction when viewed from the front surface of the device.

In addition, in the following, a direction in which a manuscript is being transported (+V direction) may be referred to as "downstream", and an opposite direction (−V direction) may be referred to as "upstream".

In FIG. 1 to FIG. 4, the scanner 1A includes a device body 2, and a support 5 that rotatably supports the device body 2.

The device body 2 is configured by including a lower unit 3 and an upper unit 4.

The upper unit 4 is provided so as to be openable and closable by rotating about a rotary shaft (not illustrated) with respect to the lower unit 3, and by opening the upper unit 4 forward the device, the manuscript transport path T to be described later can be exposed.

Figure 4:
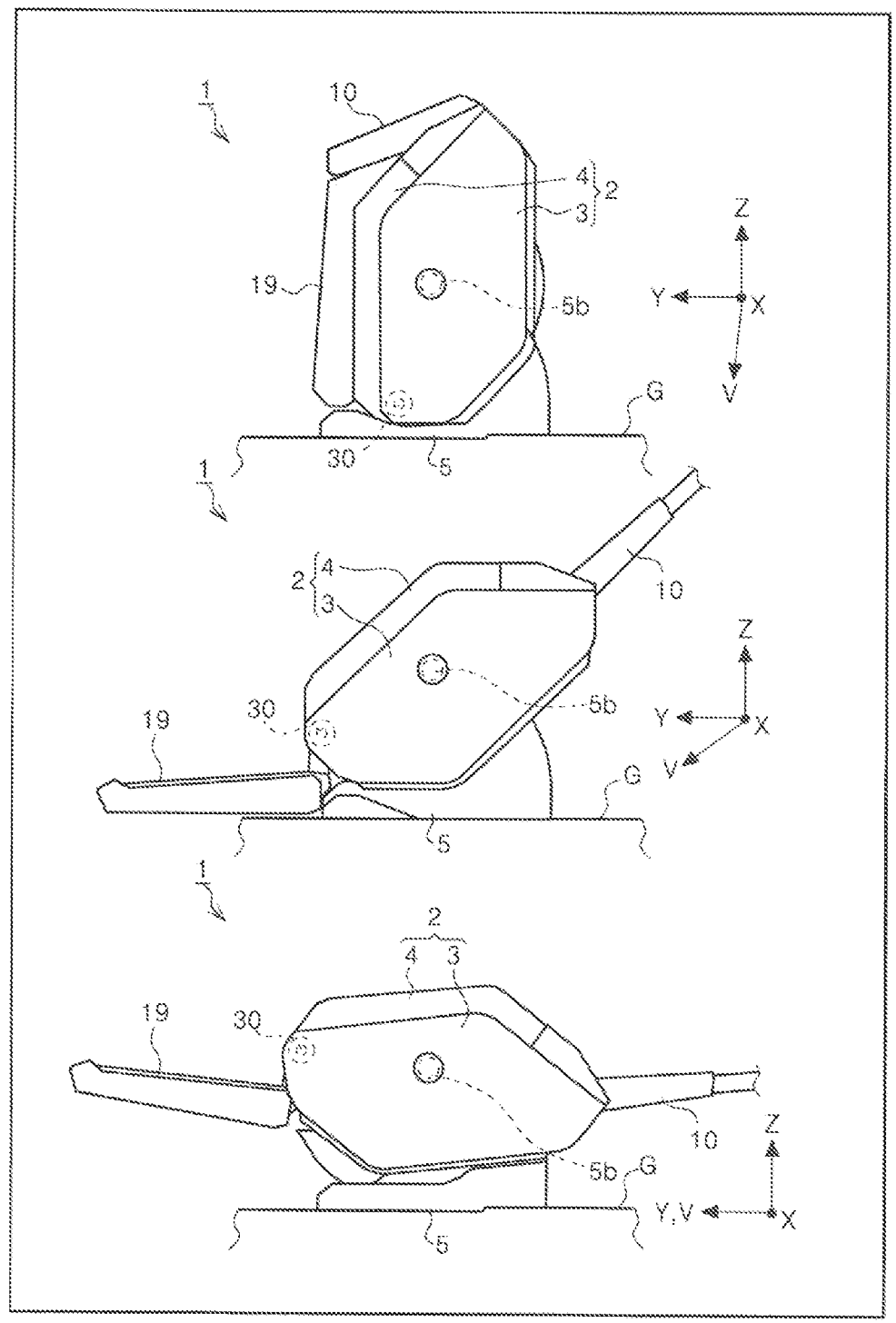
FIG. 4 is a diagram illustrating a variation in the posture of the device body.

The lower unit 3 constituting the device body 2 is provided so as to be rotatable with respect to an arm portion 5a that constitutes the support 5, via a rotary shaft 5b. As a result, the device body 2 can change in posture and is configured so as to be able to hold three postures. Two of the three postures of the device body 2 are postures when a manuscript is read, and remaining one is a posture when un-used. The postures respectively illustrated in a middle figure and in a lowermost figure of FIG. 4 are the postures when a manuscript is read, the middle figure of FIG. 4 is a first device posture, and the lowermost figure of FIG. 4 is a second device posture. Further, an uppermost figure of FIG. 4 is the posture when un-used. The posture when un-used can also be referred to as a third device posture.

The posture when un-used is a posture that makes a projected area of the device body 2 on an installation surface G on which the scanner 1A is installed the smallest, and more specifically, makes an occupying space in the Y-axis direction the smallest. In the first device posture, the projected area increases compared to the posture when un-used, and in the second device posture, the projected area increases compared to the first device posture. Furthermore, in the first device posture, the +V direction, which is the manuscript feeding direction, faces diagonally downward, and in the second device posture, the +V direction approaches a horizontal direction.

Figure 3:
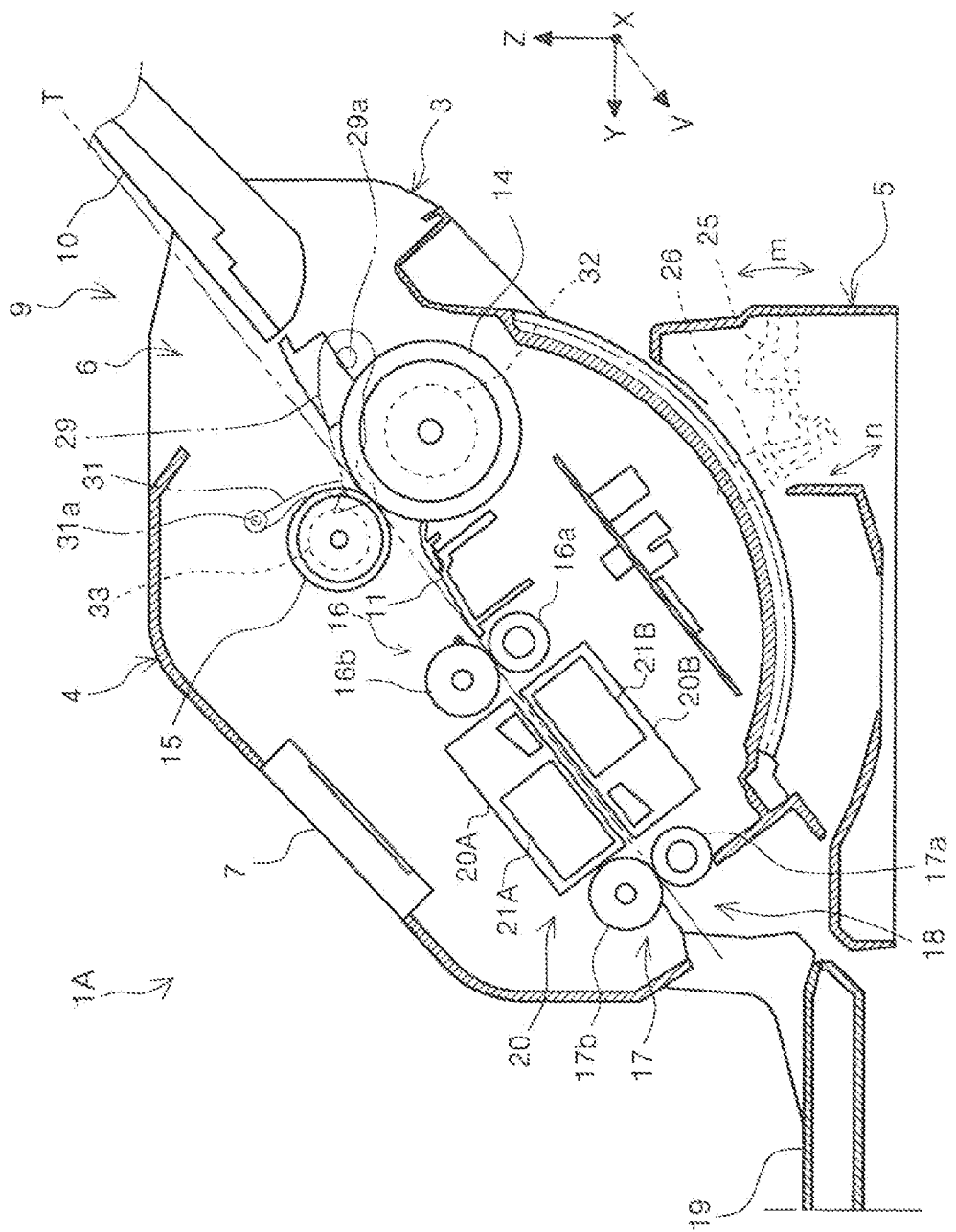
FIG. 3 is a cross-sectional view of a manuscript transport path of the scanner, viewed from a width direction, with the device body in the first device posture.

A configuration is adopted in which a holding state of each posture of the device body 2 can be released by an operating lever 25 illustrated in FIG. 3. The operating lever 25 is provided so as to be rotatable in an arrow m direction. The operating lever 25 is engaged with a locking member 26, and in association with rotation of the operating lever 25 in the arrow m direction, the locking member 26 is displaced in an arrow n direction, that is, the locking member 26 advances and retreats with respect to the device body 2. The locking member 26 is configured to advance to the device body 2, and enter a recessed portion (not illustrated) provided at a position facing the support 5 in the lower unit 3. The recessed portions are provided at three places so as to correspond to the respective postures of the device body 2, and each posture of the device body 2 is maintained by the locking member 26 entering the recessed portion. Furthermore, the locking member 26 retreats from the recessed portion, thereby releasing the posture holding of the device body 2. The posture of the device body 2 is switched by a user rotating the device body 2 while the posture holding is released.

Each posture of the device body 2 can be detected by a posture detector 80 (see FIG. 5) described below, which will be described in detail later.

The upper unit 4 includes a front surface cover 19, and the lower unit 3 includes an upper surface cover 10. The front surface cover 19 is provided so as to be rotatable about a rotary shaft 30 with respect to the lower unit 3 and the upper unit 4, and can be rotated to be in a closed state as illustrated in the uppermost figure of FIG. 4, and in an open state as illustrated in the middle figure and the lowermost figure of FIG. 4. The front surface cover 19 functions by being opened as a discharge tray that receives a manuscript for which reading is performed and that is discharged.

Note that, when the device body 2 is in the first device posture (middle figure of FIG. 4), rotation of the front surface cover 19 in an opening direction is regulated by the support 5. That is, in this state, an opening angle is smaller than a maximum opening angle of the front surface cover 19 with respect to the device body 2. When the device body 2 switches from this state to the second device posture (lowermost figure of FIG. 4), the regulation is eliminated and the front surface cover 19 has the maximum opening angle with respect to the device body 2. At this time, it is not necessary for the user to operate the front surface cover 19, and by switching the posture of the device body 2 to the second device posture, the front surface cover 19 has the maximum opening angle with respect to the device body 2.

Figure 2:
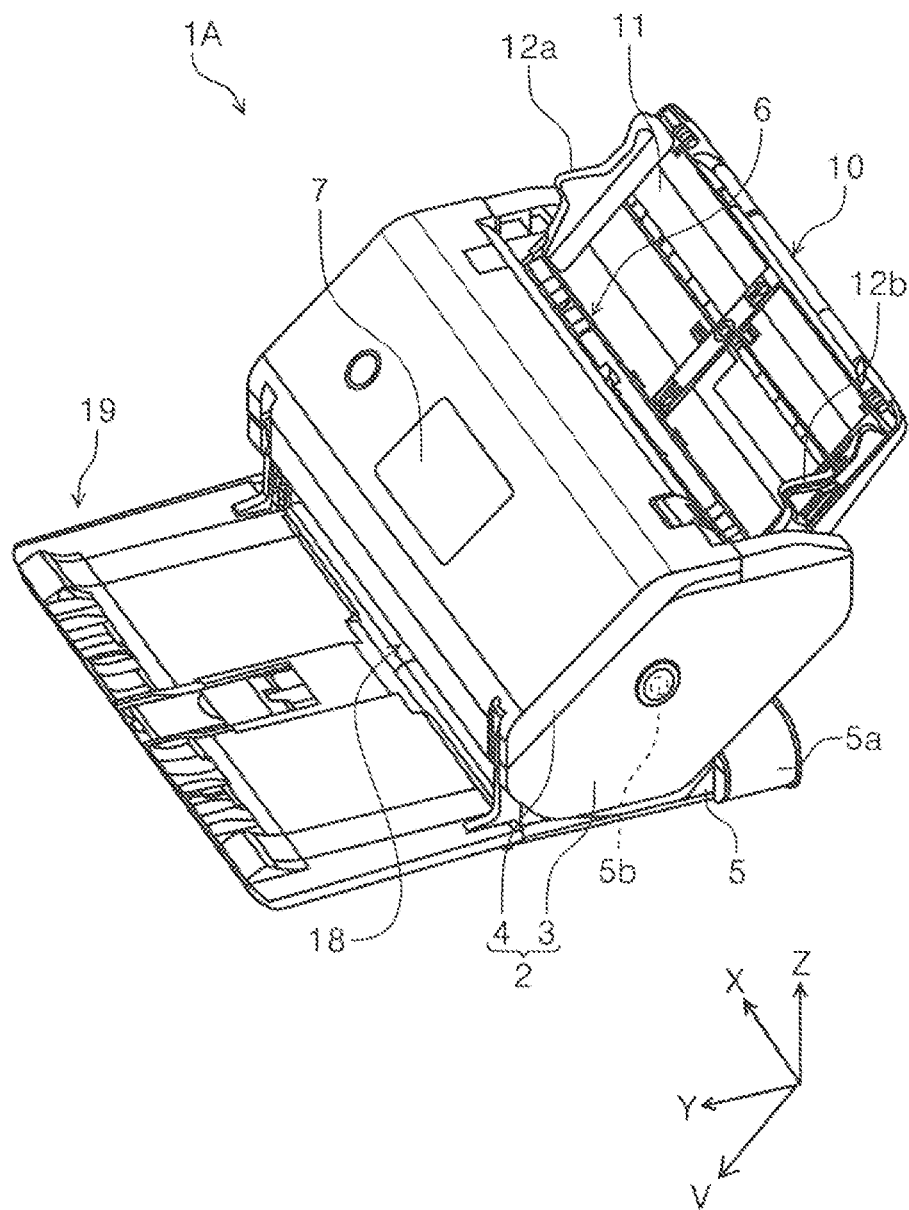
FIG. 2 is an external perspective view of the scanner viewed from the front, with the device body in the first device posture and with a front surface cover open.

As illustrated in FIG. 2, the upper unit 4 is provided with an operating panel 7 with which a user interface is realized for performing various kinds of reading setting and reading performing, and displaying contents of the reading setting and other information. The operating panel 7 as an operating unit is a so-called touch panel with which both display and input can be performed in the present exemplary embodiment, and combines the operating unit for performing various operations and a display unit for displaying various types of information. The operating panel 7 is exposed by opening the front surface cover 19.

The upper surface cover 10 provided at the lower unit 3 is provided so as to be rotatable with respect to the lower unit 3, and can rotate to be in the closed state as illustrated in FIG. 1 and in the open state as illustrated in FIG. 2 and FIG. 3. The upper surface cover 10 supports a manuscript to be fed by being opened. In other words, the upper surface cover 10 is an example of a medium placement unit on which a medium representative of a manuscript is placed. In FIG. 2, reference signs 12a and 12b denote edge guides that guide the side edges of a manuscript respectively. A feeding port 6 that communicates with an inside of the device body 2 is provided at an upper portion of the device body 2, and a manuscript placed on the upper surface cover 10 is fed from the feeding port 6 toward the inside of the device body 2.

Next, a manuscript transport path of the scanner 1A will be described primarily with reference to FIG. 3. The manuscript transport path T is a manuscript transport path formed between the lower unit 3 and the upper unit 4.

The upper surface cover 10 described above is provided at the most upstream of the manuscript transport path T, and a feeding roller 14 that feeds downstream a manuscript placed on the upper surface cover 10, and a separating roller 15 that nips and separates the manuscript together with the feeding roller 14 is provided downstream the upper surface cover 10.

The feeding roller 14 is in contact with, of manuscripts placed on the upper surface cover 10, the lowest one. Accordingly, when a plurality of manuscripts are placed on the upper surface cover 10, the manuscripts are fed sequentially downstream from the lowest manuscript.

A member denoted by a reference sign 31 is a flap, and the flap 31 is provided further upstream of a curvature forming unit 43 (see FIG. 6) described below, and prevents contact of a manuscript set on the upper surface cover 10 with the separating roller 15 in a feed standby state. The flap 31 is rotatable about a rotary shaft 31a, and a lower end portion is engaged with a set guide 29 before feeding is started, and rotation in a clockwise direction in FIG. 3 is stopped. The set guide 29 is in a state of supporting a manuscript so as not to brought the manuscript into contact with the feeding roller 14 before feeding is started.

When manuscript feeding is started, the set guide 29 is in a state of rotating in a counterclockwise direction in FIG. 3 about a rotary shaft 29a by power of a transport motor 58 (see FIG. 5), and bringing a manuscript into contact with the feeding roller 14. This allows the flap 31 to rotate, and a leading end of a manuscript bundle placed on the upper surface cover 10 abuts on the separating roller 15.

Torque is transmitted to the feeding roller 14 in the counterclockwise direction in FIG. 3 from a feeding motor 57 via a one-way clutch 32, that is, in a direction in which a manuscript is rotated downstream in the feeding direction. Hereinafter, a rotational direction of the feeding roller 14 when the feeding roller 14 feeds a manuscript downstream is referred to as a forward direction, and a reverse rotation direction thereof is referred to as a reverse direction. Likewise, for rotation directions of the feeding motor 57 as well, a rotation direction when a manuscript is fed downstream is referred to as a forward direction, and a reverse thereof is referred to as a reverse direction.

Because a drive force transmission path between the feeding roller 14 and the feeding motor 57 is provided with the one-way clutch 32, the feeding roller 14 does not rotate reversely even when the feeding motor 57 rotates reversely. In addition, in a state where the feeding motor 57 is stopped, the feeding roller 14 contacts a manuscript to be transported and can follow and rotate in the forward direction.

Subsequently, rotational torque is transmitted from the separating motor 59 via a torque limiter 33 to the separating roller 15. When a manuscript is not interposed between the feeding roller 14 and the separating roller 15, or when only one sheet is interposed, rotational torque that the feeding roller 14 attempts to rotate the separating roller 15 in the forward direction exceeds an upper torque limit value of the torque limiter 33, and this causes slippage in the torque limiter 33, thereby causing the separating roller 15 to follow and rotate in the clockwise direction of FIG. 3, that is, to slip, regardless of the rotational torque received from the separating motor 59. During feed operation of a manuscript, the separating motor 59 basically generates rotational torque that attempts to rotate the separating roller 15 in the counterclockwise direction of FIG. 3.

Thus, when second and subsequent manuscripts enter between the feeding roller 14 and the separating roller 15 in addition to a manuscript to be fed, slippage occurs between the manuscripts, so that the separating roller 15 is rotated reversely due to driving torque received from the separating motor 59. As a result, the second and subsequent manuscripts that are to be subjected to multi feed are returned upstream, that is, multi feed is prevented.

Note that, the separating roller 15 is pressed toward the feeding roller 14 by a pressing member (not illustrated). A compression coil spring can be employed as an example of the pressing member that presses the separating roller 15 toward the feeding roller 14. Note that, a spring length of the compression coil spring can be switched to at least two stages by a solenoid (not illustrated) that is controlled by a control unit 50 (see FIG. 5), and thus pressing force that presses the separating roller 15 toward the feeding roller 14 can be switched to first pressing force and second pressing force that is smaller.

The upper surface cover 10, the feeding roller 14, the separating roller 15, and the curvature forming unit 43 (see FIG. 6) described above constitute a manuscript feeding device 9 that feeds a manuscript that is an example of a medium. In another point of view, the manuscript feeding device 9 may be considered as a device that is obtained by omitting a function related to reading a manuscript from the scanner 1A (the reading unit 20 described below). Alternatively, even when a function related to reading a manuscript (the reading unit 20 described below) is provided, the scanner 1A itself can be considered as a manuscript feeding device, when focusing on a point of view of manuscript feeding.

Next, a transport roller pair 16, the reading unit 20 as a reading means for reading a manuscript image, and a discharge roller pair 17 are provided downstream the feeding roller 14. The transport roller pair 16 includes a transport driving roller 16a that is rotated and driven by the transport motor 58 (see FIG. 5), and a transport driven roller 16b that follows and rotates.

A manuscript nipped by the feeding roller 14 and the separating roller 15 and fed downstream, is nipped by the transfer roller pair 16, and transported to a position facing an upper sensor unit 20A and a lower sensor unit 20B positioned downstream the transfer roller pair 16.

The reading unit 20 is positioned above the manuscript transport path T, and includes the upper sensor unit 20A provided at the upper unit 4, and the lower sensor unit 20B positioned below the manuscript transport path T, and provided at the lower unit 3. The upper sensor unit 20A has a sensor module 21A, and the lower sensor unit 20B includes a sensor module 21B. In the present exemplary embodiment, the sensor modules 21A and 21B are each a contact image sensor module (CISM).

By the sensor module 21A positioned above the manuscript transport path T, an upper surface of a manuscript is read, and by the sensor module 21B positioned below the manuscript transport path T, a lower surface of the manuscript is read.

Note that, a manuscript reading surface (not illustrated) by the upper sensor unit 20A and a manuscript reading surface (not illustrated) by the lower sensor unit 20B each form a plane parallel to the manuscript transport path T.

After an image on at least one surface of an upper surface and a lower surface of a manuscript is read by the reading unit 20, the manuscript is nipped by the discharge roller pair 17 positioned downstream the reading unit 20 and is discharged from the discharge port 18.

The discharge roller pair 17 includes a discharge driving roller 17a that is rotated and driven by the transport motor 58 (see FIG. 8) and a discharge driven roller 17b that follows and rotates.

Figure 5:
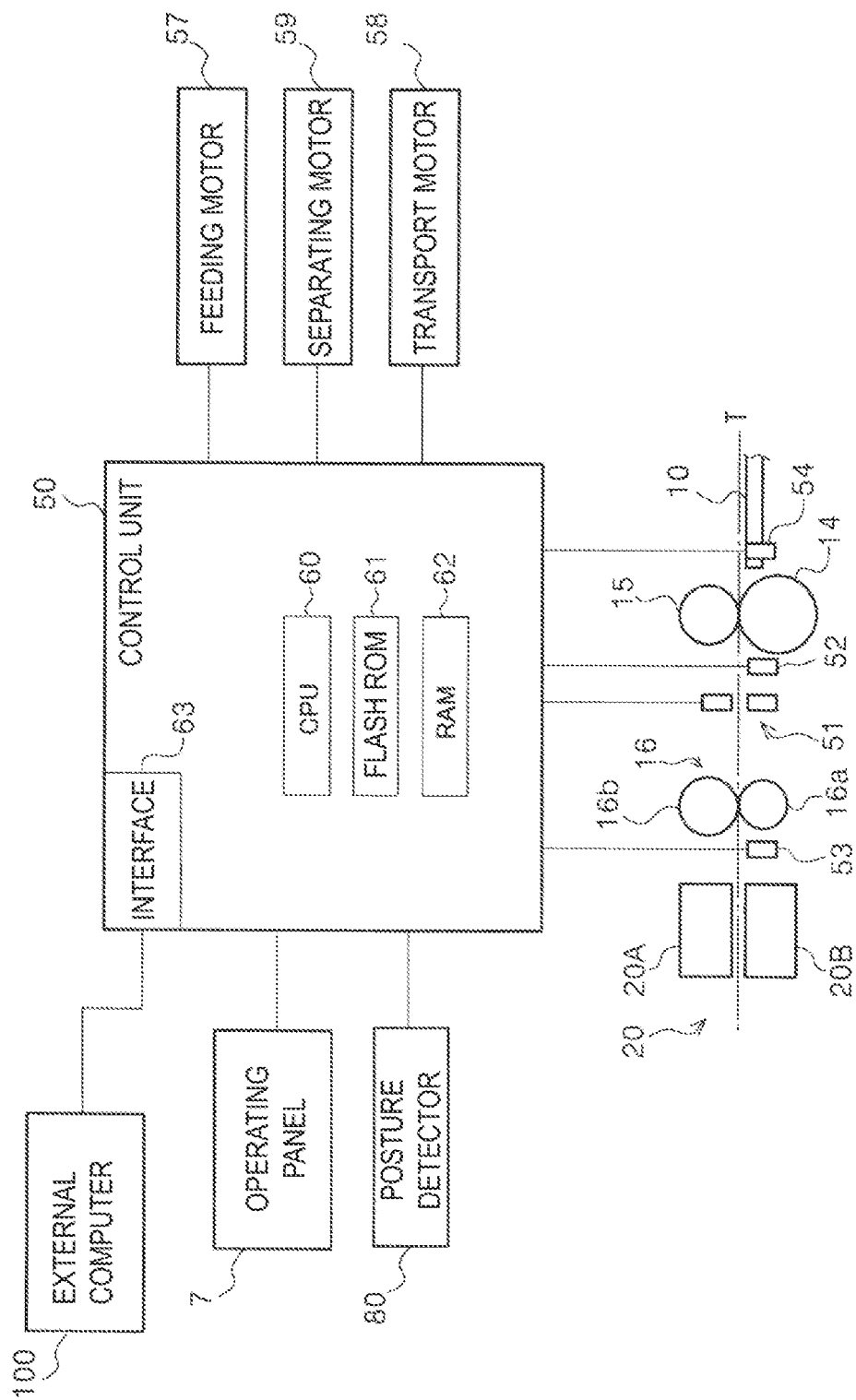
FIG. 5 is a block diagram illustrating a control system of the scanner.

Next, a control system in the scanner 1A will be described with reference to FIG. 5.

The control unit 50 performs various types of control of the scanner 1A, including feeding, transporting, discharge control, reading control, and the like of a manuscript. A signal from the operating panel 7 is inputted to the control unit 50, and a signal for achieving display of the operating panel 7, in particular a user interface (UI), is transmitted from the control unit 50 to the operating panel 7.

The control unit 50 controls the feeding motor 57, the transport motor 58, and the separating motor 59. In the present exemplary embodiment, each motor is a DC motor.

Read data from the reading unit 20 is inputted to the control unit 50, and a signal for controlling the reading unit 20 is transmitted from the control unit 50 to the reading unit 20.

Signals from a placement detector 54, a multi feed detector 51, a first manuscript detector 52, a second manuscript detector 53, and a posture detector 80 are inputted to the control unit 50.

Further, a detection value of a rotary encoder (not illustrated) provided for each of the feeding motor 57, the transport motor 58, and the separating motor 59 is inputted to the control unit 50, and the control unit 50 can thereby grasp an amount of rotation of each motor.

The control unit 50 includes a CPU 60, a flash ROM 61, and a RAM 62. The CPU 60 performs various types of arithmetic processing according to a program stored in the flash ROM 61, and controls operation of the entire scanner 1A. The flash ROM 61, which is an example of a storage means, is a non-volatile memory for which reading and writing are possible. Further, various types of configuration information inputted by a user via the operating panel 7 are also stored in the flash ROM 61. The RAM 62, which is an example of a storage means, stores various types of information temporarily.

The control unit 50 includes an interface 63, and is capable of communicating with an external computer 100 via the interface 63.

Next, each detector provided in a manuscript feed path T will be described.

The placement detector 54 is a detector provided upstream the feeding roller 14. The control unit 50 can detect presence or absence of a manuscript on the upper surface cover 10 by a signal transmitted from the placement detector 54.

The first manuscript detector 52 is a detector provided between the feeding roller 14 and the transport roller pair 16. The control unit 50 can detect passage of a leading end or a trailing end of a manuscript by a signal transmitted from the first manuscript detector 52. The placement detector 54 and the first manuscript detector 52 may be non-contact type sensors or may be contact-type sensors.

The multi feed detector 51 is a detector provided between the feeding roller 14 and the transport roller pair 16, and includes an ultrasonic transmitter and an ultrasonic receiver disposed facing each other with the manuscript feed path T interposed therebetween. The control unit 50 can detect multi feed of manuscripts by a signal transmitted from the multi feed detector 51.

The second manuscript detector 53 is a detector provided between the transport roller pair 16 and the reading unit 20, and the control unit 50 can detect passage of a leading end or a trailing end of a manuscript by a signal transmitted from the second manuscript detector 53. The second manuscript detector 53 may be a non-contact type sensor or a contact-type sensor.

A configuration of the posture detector 80 will be described later, but the control unit 50 switches feeding modes based on a detection signal from the posture detector 80.

Figure 10:
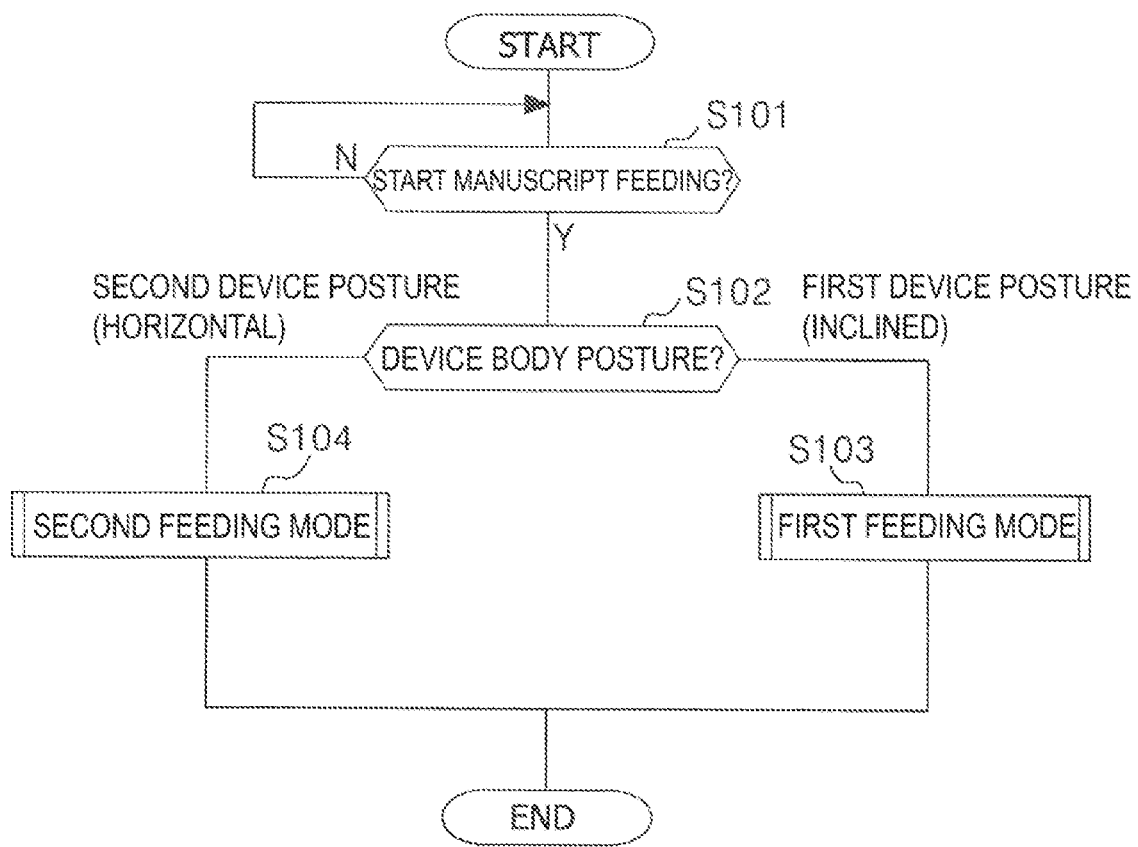
FIG. 10 is a flowchart illustrating a flow of determination of a feeding mode.

In FIG. 10, when receiving an instruction to start manuscript feeding (Yes in step S101), the control unit 50 determines a posture of the device body 2 based on a detection signal from the posture detector 80 (step S102). As a result, in a case of the first device posture (middle figure of FIG. 4), a first feeding mode is performed (step S103), and in a case of the second device position (lower figure of FIG. 4), a second feeding mode is performed (step S104).

Differences between the first feeding mode and the second feeding mode include a state of the curvature forming unit 43 described below, control of the separating motor 59, and pressing force that presses the separating roller 15 to the feeding roller 14. The first feeding mode is a mode corresponding to a case where a manuscript is plain paper or cardboard, and the second feeding mode is a mode corresponding to a case where a manuscript is thin paper or prone to damage.

In the first feeding mode, a drive speed of the separating motor 59 is a first drive speed, and in the second feeding mode, a drive speed of the separating motor 59 is a second drive speed that is lower than the first drive speed.

In addition, the pressing force that presses the separating roller 15 to the feeding roller 14 is first pressing force in the first feeding mode, and is second pressing force that is smaller than the first pressing force in the second feeding mode.

The curvature forming unit is brought into the second state in the first feeding mode, and into the first state in the second feeding mode.

Figure 6:
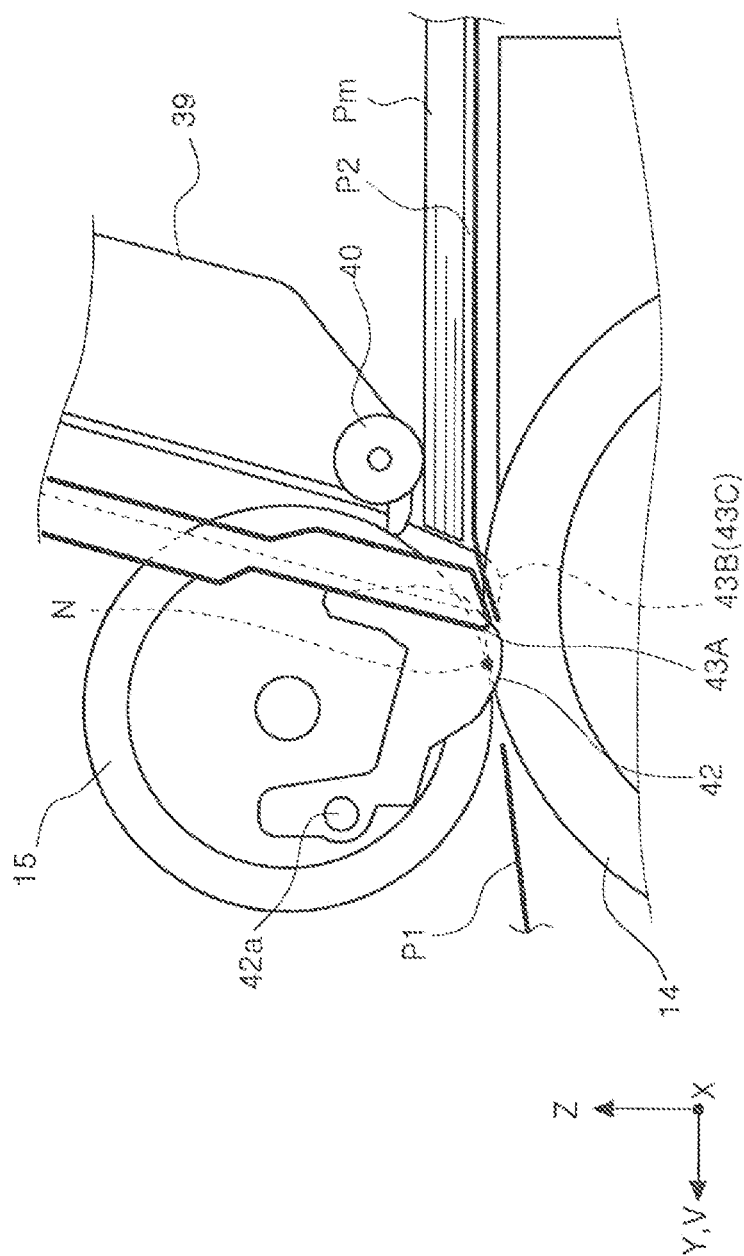
FIG. 6 is an A-A cross-sectional view of FIG. 9, and is a diagram in which a curvature forming unit is in a first state.

The curvature forming unit will be described below with reference to FIG. 6 to FIG. 9. In FIG. 6, a reference sign P1 denotes a preceding manuscript, a reference sign P2 denotes a subsequent manuscript positioned above the preceding manuscript, and a reference sign Pm denotes a manuscript bundle. In addition, a reference sign 39 denotes a pressing unit for pressing the manuscript bundle Pm, and a reference sign 40 denotes a driven roller provided at the pressing unit 39.

When the preceding manuscript P1 is fed out, the subsequent manuscript P2 is also about to be fed out, by friction force between the preceding manuscript P1 and the subsequent manuscript P2. At this time, a leading end of the subsequent manuscript P2 is held back by the separating roller 15, but when rigidity of the subsequent manuscript P2 is low, that leading end deflects along the feeding direction upstream of a nip position N between the separating roller 15 and the feeding roller 14, which may cause a jam later. In addition, when a trailing end of the preceding manuscript P1 passes through the nip position N, the separating roller 15 is reversed by a predetermined amount, and thus, the deflection is also formed by the reversal of the separating roller 15.

Figure 8:
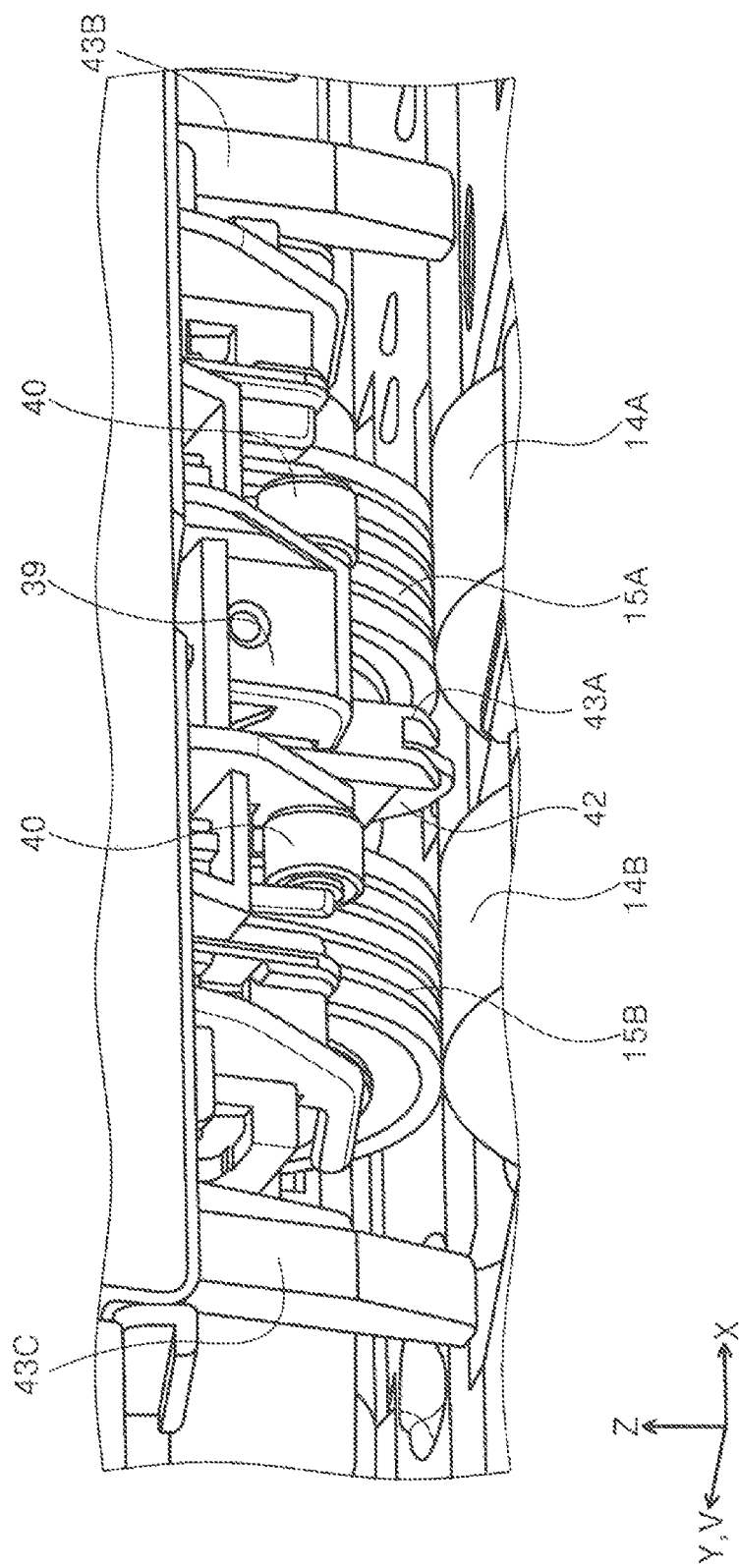
FIG. 8 is a perspective view of a vicinity of a feeding roller and a separating roller.
Figure 9:
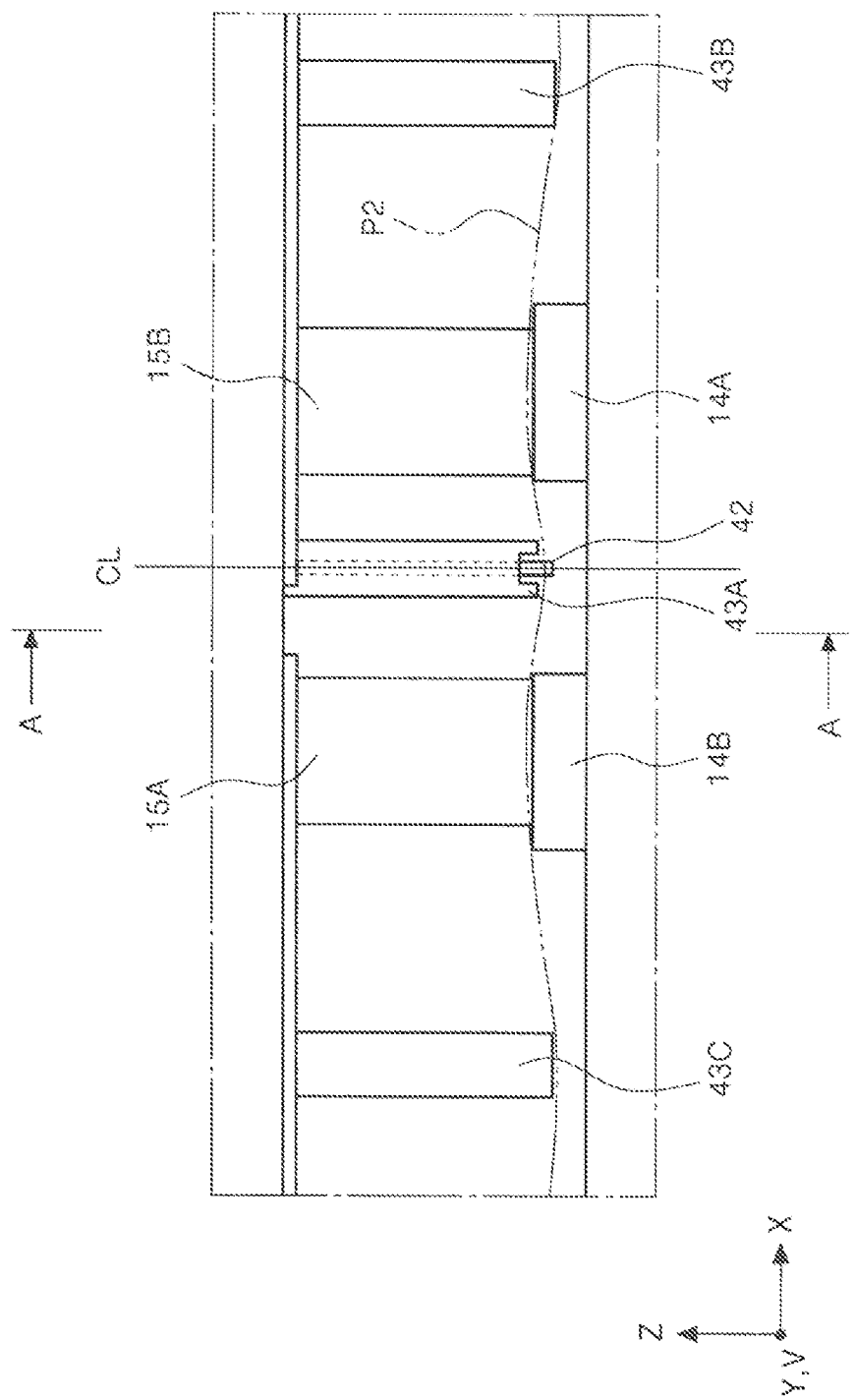
FIG. 9 is a front view of a vicinity of the feeding roller and the separating roller.

In order to suppress the above-described deflection of the leading end of the subsequent manuscript P2, in the present exemplary embodiment, a configuration is provided for forming a curvature along a width direction with respect to the leading end of the subsequent manuscript P2. In FIG. 8 and FIG. 9, a reference sign 14A denotes a first feeding roller, and a reference sign 14B denotes a second feeding roller. That is, the plurality of feeding rollers 14 are provided in the present exemplary embodiment, and the plurality of feeding rollers 14 include the first feeding roller 14A, and the second feeding roller 14B provided at intervals in the manuscript width direction with respect to the first feeding roller 14A.

Similarly, the plurality of separating rollers 15 are provided, and the plurality of separating rollers 15 include a first separating roller 15A that faces the first feeding roller 14A, and a second separating roller 15B that faces the second feeding roller 14B.

Note that, in FIG. 9, a straight line CL indicates a center position in the manuscript width direction, and a center position in a width direction of a manuscript being fed, when appropriately set to the upper surface cover 10 (see FIG. 2), will match the center position CL for a manuscript of any size. The first separating roller 15A and the second separating roller 15B are disposed so as to be left-right symmetrical with respect to the center position CL, and the first feeding roller 14A and the second feeding roller 14B are disposed so as to be left-right symmetrical with respect to the center position CL.

Further, a first curvature forming unit 43A and an auxiliary curvature forming unit 42, which will be described later, are provided at the center position CL, and a second curvature forming unit 43B and a third curvature forming unit 43C are disposed at respective positions that are left-right symmetrical with respect to the center position CL.

The first curvature forming unit 43A forms a curvature in the manuscript width direction with respect to a manuscript. As illustrated in FIG. 6, the first curvature forming unit 43A contacts a manuscript upstream the nip position N between the feeding roller 14 and the separating roller 15 in the feeding direction, and between the first separating roller 15A and the second separating roller 15B in the manuscript width direction as illustrated in FIG. 8 and FIG. 9.

As illustrated in FIG. 6 and FIG. 9, the first curvature forming unit 43A is configured so that a site contacting a manuscript is positioned in a direction of a center of rotation of the feeding roller 14 from an outer circumferential surface of the feeding roller 14, and that state is maintained. In the present exemplary embodiment, an overlapping amount of the first curvature forming unit 43A and the feeding roller 14 when viewed from the manuscript width direction is set to from 0.25 mm to 0.75 mm.

With such a configuration, a curvature along the manuscript width direction is formed at the leading end of the subsequent manuscript P2 as illustrated in FIG. 9, and rigidity in the feeding direction is improved. This makes it possible to suppress deflection of the leading end of the subsequent manuscript P2 along the feeding direction upstream the nip position N between the separating roller 15 and the feeding roller 14, and thus a jam can be suppressed.

Note that, the first curvature forming unit 43A has an inclined surface in which a surface upstream in the feeding direction is inclined obliquely downward, and a lower end portion has a shape such that an overlapping amount with the feeding roller 14 increases toward downstream in the feeding direction. This makes it difficult for a manuscript leading end to catch on the first curvature forming unit 43A.

In addition, as illustrated in FIG. 8 and FIG. 9, in the present exemplary embodiment, the second curvature forming unit 43B and the third curvature forming unit 43C are provided, that form a curvature along the manuscript width direction with respect to a manuscript, together with the first curvature forming unit 43A. The second curvature forming unit 43B and the third curvature forming unit 43C are members provided as a pair.

A state is maintained in which, the second curvature forming unit 43B contacts a manuscript at a position that is upstream the nip position N between the feeding roller 14 and the separating roller 15 in the feeding direction as illustrated in FIG. 6, and that is spaced in a first direction (+X direction) that is one direction of the manuscript width direction with respect to the first separating roller 15A as illustrated in FIG. 8 and FIG. 9, and a site in contact with the manuscript is positioned in the direction of the center of rotation of the feeding roller 14 from the outer circumferential surface of the feeding roller 14.

A state is maintained in which, the third curvature forming unit 43C contacts a manuscript at a position that is upstream the nip position N between the feeding roller 14 and the separating roller 15 in the feeding direction as illustrated in FIG. 6, and that is spaced in a second direction (−X direction) opposite the first direction (+X direction) in the manuscript width direction with respect to the second separating roller 15B as illustrated in FIG. 8 and FIG. 9, and a site in contact with the manuscript is positioned in the direction of the center of rotation of the feeding roller 14 from the outer circumferential surface of the feeding roller 14.

In the present exemplary embodiment, an overlapping amount of the second curvature forming unit 43B and the third curvature forming unit 43C and the feeding roller 14 when viewed from the manuscript width direction is set to approximately 1.0 mm.

With such a second curvature forming unit 43B and a third curvature forming unit 43C, a curvature along the manuscript width direction at the leading end of the subsequent manuscript P2 can be more reliably formed as illustrated in FIG. 9, deflection of the leading end of the subsequent manuscript P2 along the feeding direction upstream the nip position between the separating roller 15 and the feeding roller 14 can be more reliably suppressed, and thus a jam can be more reliably suppressed.

Note that, in the present exemplary embodiment, the auxiliary curvature forming unit 42 is provided. The auxiliary curvature forming unit 42 is provided so as to be swingable in a clockwise direction and a counterclockwise direction in FIG. 6 around a swing shaft 42a illustrated in FIG. 6, and is pressed in the clockwise direction in FIG. 6 by a spring (not illustrated). The auxiliary curvature forming unit 42 advances and retreats with respect to a manuscript feeding path by swinging, and advances to the manuscript feeding path, thereby forming a curvature along the manuscript width direction with respect to a manuscript. FIG. 6 illustrates a state in which the auxiliary curvature forming unit 42 advances to the manuscript feeding path.

In the present exemplary embodiment, the auxiliary curvature forming unit 42 is at a position including the nip position N between the feeding roller 14 and the separating roller 15 in the manuscript feeding direction, and contacts a manuscript between the first separating roller 15A and the second separating roller 15B in the manuscript width direction as illustrated in FIG. 8 and FIG. 9. In the present exemplary embodiment, an overlapping amount of the auxiliary curvature forming unit 42 and the feeding roller 14 when viewed from the manuscript width direction is set to approximately 1.0 mm.

When, with such an auxiliary curvature forming unit 42, a curvature along the manuscript width direction is formed in a manuscript, rigidity in the manuscript feeding direction is further improved, in particular, a leading end of the manuscript can be reliably advanced downstream the nip position N between the separating roller 15 and the feeding roller 14, and thus, a jam downstream the nip position N can be suppressed.

Note that, as illustrated in FIG. 6, the first curvature forming unit 43A and the auxiliary curvature forming unit 42 are formed so as to be smoothly coupled so that respective lower end portions do not form large recesses and protrusions in the feeding path along the feeding direction when viewed from the manuscript width direction. In addition, in the present exemplary embodiment, as illustrated in FIG. 9, a width of the auxiliary curvature forming unit 42 in the manuscript width direction is less than a width of the first curvature forming unit 43A, but may be formed greater than the width of the first curvature forming unit 43A.

Next, the first curvature forming unit 43A, the second curvature forming unit 43B, and the third curvature forming unit 43C are configured to be able to switch, in association with posture switching of the device body 2, between the first state for forming a curvature in a manuscript, and the second state positioned in a direction that is retracted from the manuscript feeding path compared to the first state. Note that, in the following, when the first curvature forming unit 43A, the second curvature forming unit 43B, and the third curvature forming unit 43C need not particularly be distinguished, the curvature forming unit is referred to as a "curvature forming unit 43".

Figure 7:
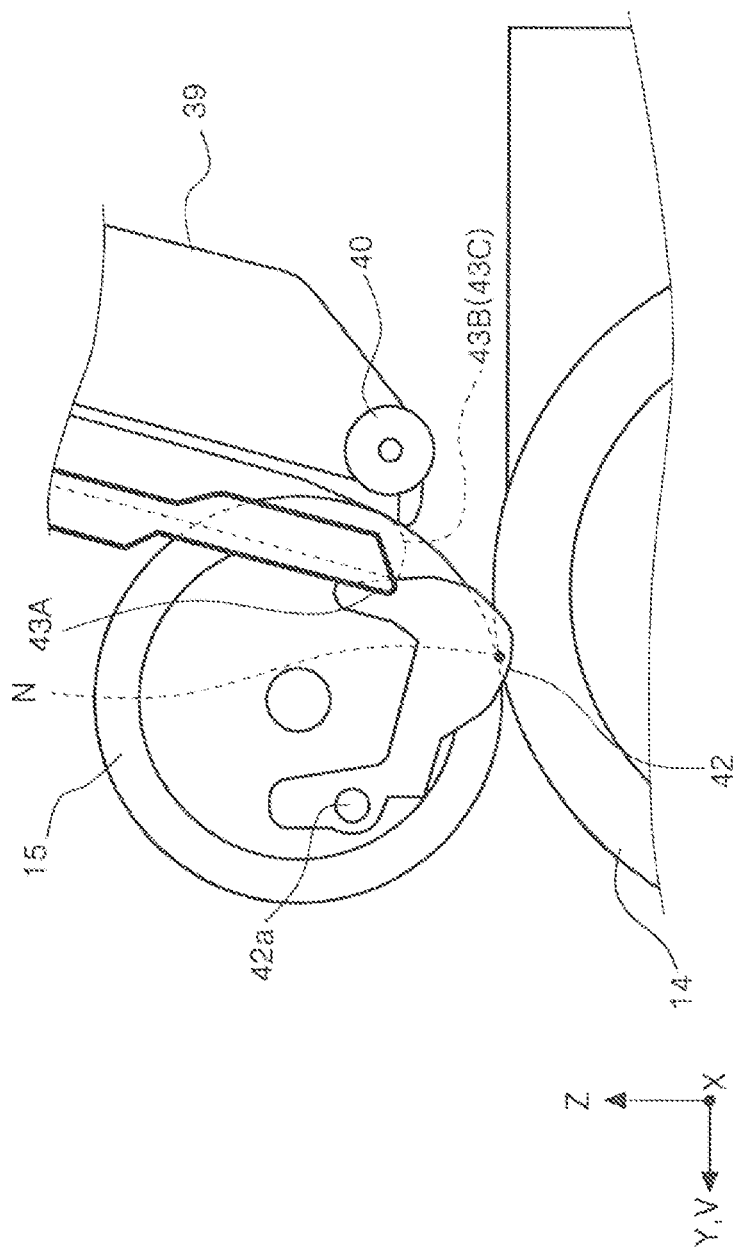
FIG. 7 is the A-A cross-sectional view of FIG. 9, and is a diagram in which the curvature forming unit is in a second state.

When the device body 2 is in the first device posture (middle figure of FIG. 4), the curvature forming unit 43 is in the second state illustrated in FIG. 7. When the device body 2 switches from the first device posture (middle figure of FIG. 4) to the second device posture (lowermost figure of FIG. 4), the curvature forming unit 43 switches from the second state in FIG. 7 to the first state illustrated in FIG. 6.

When the device body 2 is in the second device posture (lowermost figure of FIG. 4), the curvature forming unit 43 is in the first state illustrated in FIG. 6, and when the device body 2 switches from this state to the first device posture (middle figure of FIG. 4), the curvature forming unit 43 switches from the first state in FIG. 6 to the second state in FIG. 7.

A means for switching the state of the curvature forming unit 43 in association with the posture switching of the device body 2 will be described below. Note that, FIG. 11 and FIG. 13 to FIG. 17, which are used in the following description, each schematically illustrate the configuration illustrated in FIG. 3. In addition, an upper figure in each of FIG. 11 and FIG. 13 to FIG. 17 illustrates a state in which the device body 2 is in the first device posture, and a lower figure in each of FIG. 11, FIG. 13 to FIG. 17 illustrates a state in which the device body 2 is in the second device posture.

Figure 11:
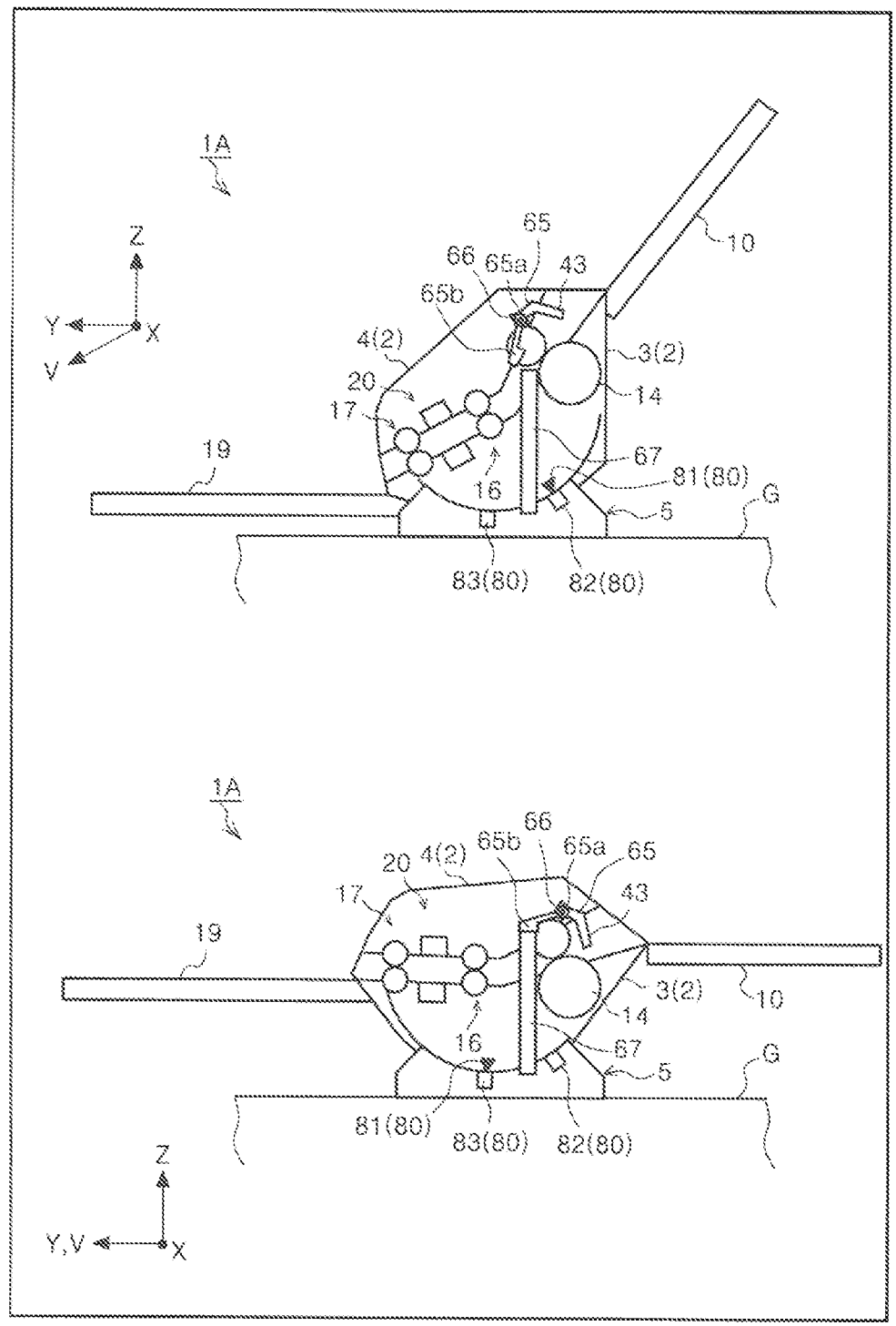
FIG. 11 is a diagram illustrating a configuration in which state switching of a curvature forming unit is performed in a scanner according to a first exemplary embodiment.

In the scanner 1A illustrated in FIG. 11, a reference sign 67 denotes a fixed portion. The fixed portion 67 is a member that is long in the Z-axis direction, and is at a position outside the manuscript transport path in the manuscript width direction (X-axis direction), and specifically, is at a position in the −X direction with respect to the manuscript transport path. The fixed portion 67 remains fixed to the support 5 independently of the posture switching of the device body 2.

Figure 12:
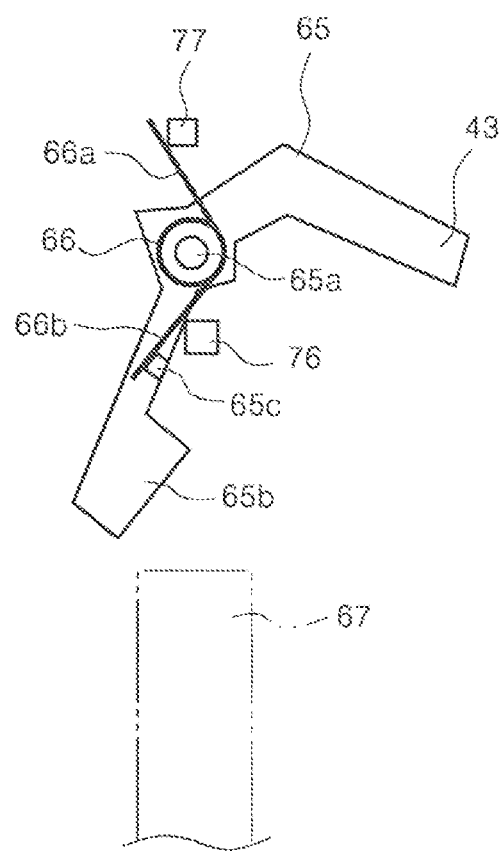
FIG. 12 is a side view of a rotary member.

Similarly, a rotary member 65 is provided at a position outside the manuscript transport path in the manuscript width direction (X-axis direction). As illustrated in detail in FIG. 12, the rotary member 65 is provided so as to be rotatable about a rotary shaft 65a. The curvature forming unit 43 is provided at a position away from the rotary shaft 65a of the rotary member 65, and the curvature forming unit 43 switches between the first state and the second state by rotation of the rotary member 65.

A torsion coil spring 66, which is an example of a pressing member, is provided around the rotary shaft 65a. One end 66a of the torsion coil spring 66 abuts on a spring abutting portion 77 provided at a device frame (not illustrated), and another end 66b abuts on a spring abutment portion 65c provided at the rotary member 65. As a result, the torsion coil spring 66 presses the rotary member 65 in a counterclockwise direction of the figure, that is, presses the rotary member 65 in a direction in which the curvature forming unit 43 is brought into the second state. Note that, off course, a compression coil spring or a tension coil spring may be used instead of the torsion coil spring 66. A reference sign 76 denotes a restricting portion provided at the device frame (not illustrated), and in a state in which the rotary member 65 does not abut on the fixed portion 67 described below, rotation of the rotary member 65 in the counterclockwise direction is stopped by the restricting portion 76.

The rotary member 65 includes an abutment portion 65b on a side away from the curvature forming unit 43 with respect to the rotary shaft 65a.

When the device body 2 is in the first device posture as illustrated in an upper figure in FIG. 11, an upper end portion of the fixed portion 67 is separated from the abutment portion 65b. As a result, the rotary member 65 is at a rotation limit in a counterclockwise direction FIG. 11 due to spring force of the torsion coil spring 66, and the curvature forming unit 43 remains in the second state.

When the device body 2 switches from the first device posture illustrated in the upper figure of FIG. 11 to the second device posture illustrated in a lower figure of FIG. 11, the abutment portion 65b abuts on the upper end portion of the fixed portion 67. Then, in association with rotation of the device body 2, the rotary member 65 rotates relative to the upper unit 4, thereby switching the curvature forming unit 43 to the first state. Conversely, when the device body 2 switches from the second device posture illustrated in the lower figure of FIG. 11 to the first device posture illustrated in the upper figure of FIG. 11, the abutment portion 65b is separated from the upper end portion of the fixed portion 67 contrary to the above, and the curvature forming unit 43 switches to the second state.

When the curvature forming unit 43 is in the first state as described above, a curvature along the width direction is formed in the leading end of the subsequent manuscript P2, rigidity in the feeding direction is improved, and a jam is suppressed. Then, when the device body 2 switches to the second device posture in which a posture of the upper surface cover 10 is closer to horizontal compared to the first device posture, it is difficult for own weight of a manuscript to act on a manuscript leading end region, and the leading end of the subsequent manuscript P2 is less likely to deflect. By employing the plurality of means, that is, the curvature forming unit 43 and the device body 2 for which the posture switching is possible as described above, it is possible to effectively suppress deflection of the leading end of the subsequent manuscript P2 along the feeding direction upstream the nip position between the separating roller 15 and the feeding roller 14, and thus a jam can be effectively suppressed.

Furthermore, the curvature forming unit 43 switches the state in association with the posture switching of the device body 2, so it is not necessary for a user to separately perform the state switching of the curvature forming unit 43 and the posture switching of the device body 2, thereby improving usability of the device. Note that, such a configuration and effect of operation are the same in other exemplary embodiments described below.

Additionally, the curvature forming unit 43 is capable of engaging with the fixed portion 67 that maintains a fixed state independently from the posture switching of the device body 2. In the configuration illustrated in FIG. 11, the curvature forming unit 43 is capable of indirectly engaging with the fixed portion 67 via the rotary member 65. Then, the curvature forming unit 43 switches between the first state and the second state, by changing the engagement between the curvature forming unit 43 and the fixed portion 67 in accordance with the posture switching of the device body 2. Accordingly, the state switching of the curvature forming unit 43 can be performed without using a power source such as a motor, and an increase in cost of the device can be suppressed.

Additionally, the curvature forming unit 43 is provided at the rotatable rotary member 65 and is configured to switch between the first state and the second state by rotation of the rotary member 65, as a result, the curvature forming unit 43 can easily perform the state switching by rotation of the rotary member 65.

Note that in FIG. 11, a detected unit 81 is provided at the device body 2. A first detector 82 and a second detector 83 are provided at intervals at the support 5 around the rotary shaft 5b (see FIG. 4) of the device body 2. The detected unit 81, the first detector 82, and the second detector 83 constitute the posture detector 80.

When the device body 2 takes the first device posture, the detected unit 81 is detected by the first detector 82, and when the device body 2 takes the second device posture, the detected unit 81 is detected by the second detector 83. The first detector 82 and the second detector 83 each transmit a detection signal of the detected unit 81 to the control unit 50 (see FIG. 5), and thus the control unit 50 can detect the posture of the device body 2. Note that, the first detector 82 and the second detector 83 may each be configured by an optical sensor that detects the detected unit 81 in a non-contact manner, or may each be configured by a mechanical sensor that detects the detected unit 81 in a contact-type manner.

Additionally, it goes without saying that a configuration may be adopted in which, in addition to the first detector 82 and the second detector 83, a third detector is provided, and a retracted posture of the device body 2 (the uppermost figure of FIG. 4) can be detected.

In addition, information related to the state of the curvature forming unit 43 may be displayed on the operating panel 7 in association with the posture switching of the device body 2. It is conceivable that, as an example of the information related to the state of the curvature forming unit 43, when the device body 2 is in the first device posture, "curvature forming unit: ascending" is displayed on the operating panel 7, and when the device body 2 is in the second device posture, "curvature forming unit: descending" is displayed on the operating panel 7. Note that, such a guide display can be said to be a guide display for a service man who maintains the device, rather than a guide display for an end user.

Examples of the guide display for the end user include a guide "a posture suitable for plain paper or cardboard" displayed when the device body 2 is in the first device posture, and a guide "a posture suitable for thin paper or a manuscript that is prone to damage" displayed when the device body 2 is in the second device posture.

Furthermore, a maximum value of the number of manuscript sets suitable for each posture may be displayed. For example, the second device posture of the device body 2 is a posture suitable for thin paper or a manuscript that is prone to damage, and a recommended maximum number of sets is less compared to a case where the device body 2 is in the first device posture, and the larger the manuscript size, the smaller the maximum number of sets. Therefore, by displaying the contents, usability can be improved.

Next, a scanner 1B according to a second exemplary embodiment will be described with reference to FIG. 13. Note that, a scanner according to each exemplary embodiment described hereinafter has the same configuration as the scanner 1A according to the first exemplary embodiment described above except that a configuration for performing the state switching of the curvature forming unit 43 or, in addition, a configuration for detecting the posture of the device body 2 is different.

Figure 13:
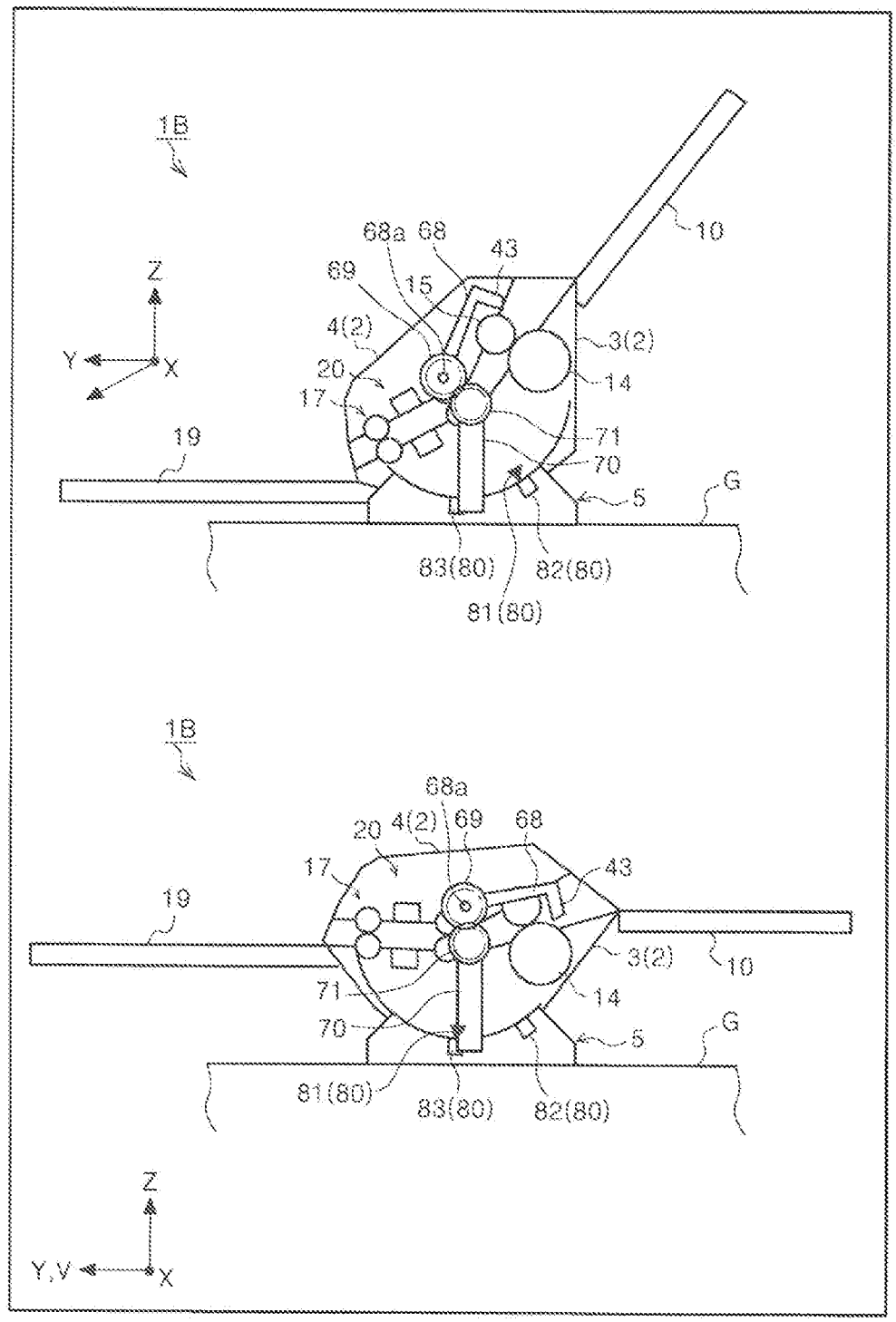
FIG. 13 is a diagram illustrating a configuration in which state switching of a curvature forming unit is performed in a scanner according to a second exemplary embodiment.

The scanner 1B illustrated in FIG. 13 includes the curvature forming unit 43 at a rotary member 68 that is rotatable about a rotary shaft 68a, and the curvature forming unit 43 switches between a first state and a second state by rotation of the rotary member 68. The rotary member 68 is positioned at a position outside a manuscript transport path in a manuscript width direction (X-axis direction), and specifically in the −X direction with respect to the manuscript transport path.

A first toothed gear portion 69 is provided around a center of a rotary shaft of the rotary member 68, and the first toothed gear portion 69 and the rotary member 68 rotate integrally about the rotation shaft 68a.

In FIG. 13, a reference sign 70 denotes a fixed portion. The fixed portion 70 is a member that is long in the Z-axis direction, and is at a position outside the manuscript transport path in the manuscript width direction (X-axis direction), and specifically, is at a position in the −X direction with respect to the manuscript transport path, and a state of being fixed to the support 5 independently from posture switching of the device body 2 is maintained.

A second toothed gear portion 71 is provided at an upper end portion of the fixed portion 70. The second toothed gear portion 71 meshes with the first toothed gear portion 69.

When the device body 2 is in a first device posture as illustrated in an upper figure of FIG. 13, the curvature forming unit 43 is in the second state. When the device body 2 switches from the first device posture illustrated in the upper figure of FIG. 13 to a second device posture illustrated in a lower figure of FIG. 13, the first toothed gear portion 69 rotates while moving around the second toothed gear portion 71 in association with rotation of the device body 2, that is, the rotary member 68 rotates. As a result, the curvature forming unit 43 switches to the first state.

Conversely, when the device body 2 switches from the second device posture illustrated in the lower figure of FIG. 13 to the first device posture illustrated in the upper figure of FIG. 13, the first toothed gear portion 69 and the rotary member 68 rotate in a direction opposite to the above, and the curvature forming unit 43 switches to the second state. With such a configuration, a configuration in which the rotary member 68 is rotated can be easily achieved.

Next, a scanner 1C according to a third exemplary embodiment will be described with reference to FIG. 14. The scanner 1C illustrated in FIG. 14 includes a tray toothed gear 73 that rotates coaxially with the rotary shaft 30 (see FIG. 4) on the front surface cover 19 that functions as a discharge tray. The tray toothed gear 73 and the first toothed gear portion 69 are engaged with each other via a toothed gear group 74. As a result, when the front surface cover 19 and the device body 2 rotate relatively, the rotary member 68 rotates, and the curvature forming unit 43 performs state switching. Note that, the tray toothed gear 73 and the toothed gear group 74 are at respective positions outside a manuscript transport path in a manuscript width direction (X-axis direction), and more specifically, are positioned in the −X direction with respect to the manuscript transport path.

Figure 14:
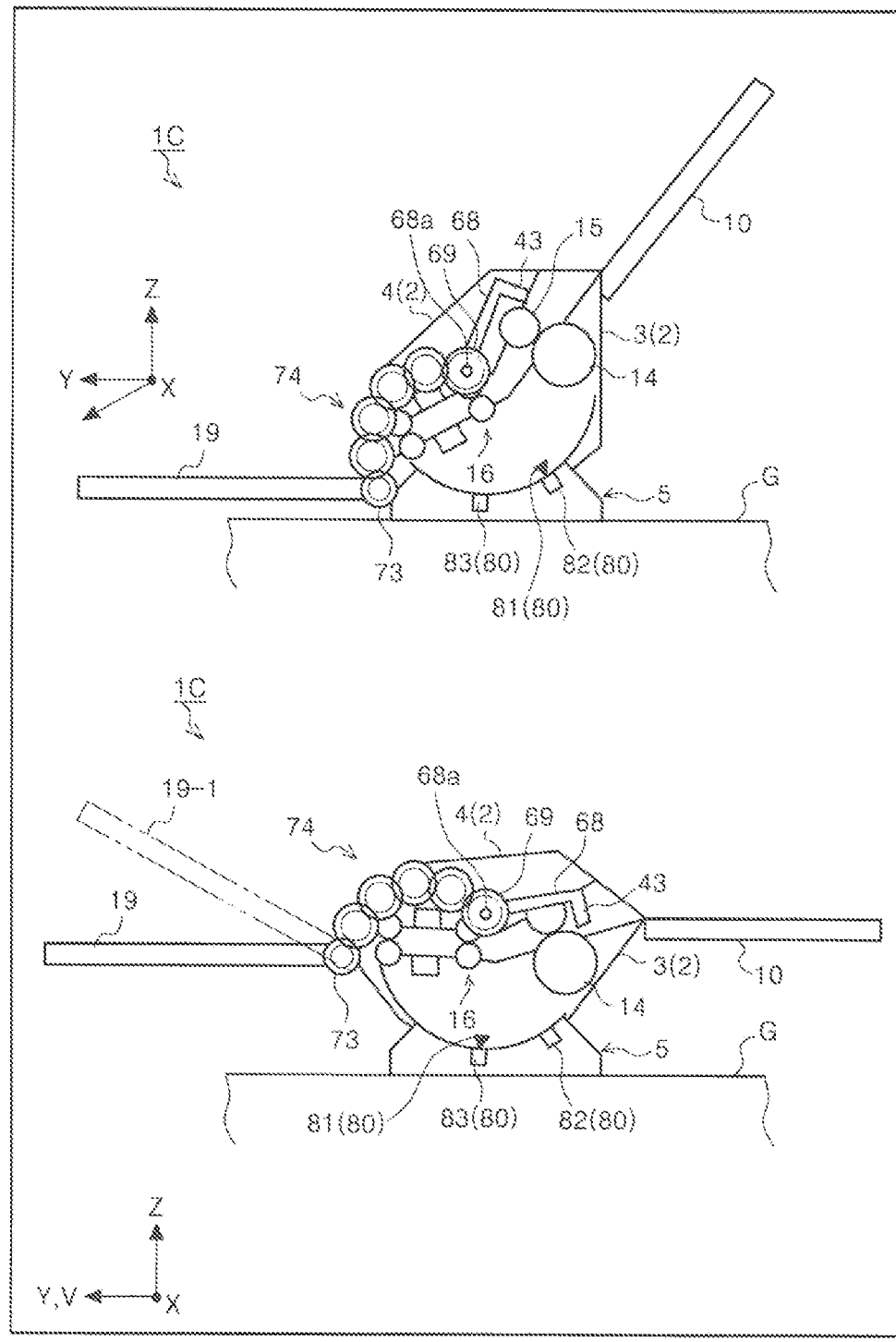
FIG. 14 is a diagram illustrating a configuration in which state switching of a curvature forming unit is performed in a scanner according to a third exemplary embodiment.

When the device body 2 is in a first device posture as illustrated in an upper figure of FIG. 14, the curvature forming unit 43 is in a second state. When the device body 2 switches from the first device posture illustrated in the upper figure of FIG. 14 to a second device posture illustrated in a lower figure of FIG. 14, the rotary member 68 rotates relative to the device body 2 in association with relative rotation between the device body 2 and the front surface cover 19. As a result, the curvature forming unit 43 switches to the first state. Conversely, when the device body 2 switches from the second device posture illustrated in the lower figure of FIG. 14 to the first device posture illustrated in the upper figure of FIG. 14, the tray toothed gear 73, the toothed gear group 74, the first toothed gear portion 69, and the rotary member 68 rotate in a direction opposite to the above, and the curvature forming unit 43 switches to the second state.

According to such a configuration, state switching of the curvature forming unit 43 can be performed without using a power source such as a motor, and an increase in cost of the device can be suppressed.

Figure 15:
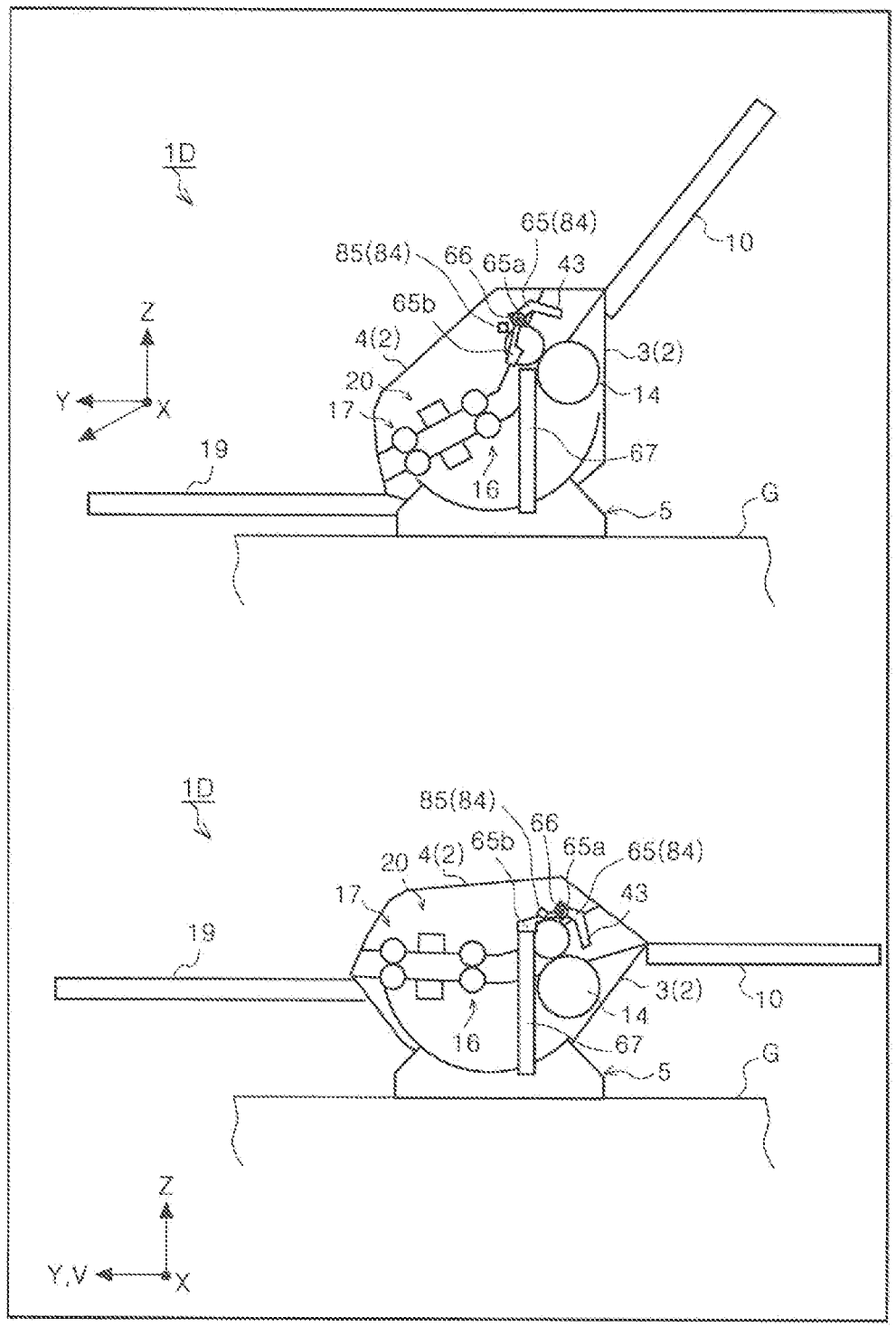
FIG. 15 is a diagram illustrating a configuration in which state switching of a curvature forming unit is performed in a scanner according to a fourth exemplary embodiment.

Next, a scanner 1D according to a fourth exemplary embodiment will be described with reference to FIG. 15. In the scanner 1D illustrated in FIG. 15, a configuration for performing state switching of the curvature forming unit 43 is the same as the scanner 1A according to the first exemplary embodiment described above. The present exemplary embodiment differs from the scanner 1A according to the first exemplary embodiment described above in that the rotary member 65 constituting a means for performing the state switching of the curvature forming unit 43 combines a means for detecting a posture of the device body 2.

Specifically, a rotation detector 85 is provided near a position where the rotary member 65 is disposed. The rotation detector 85 and the rotary member 65 constitute a posture detector 84. The posture detector 84 is a modified example of the posture detector 80 (see FIG. 11) described above.

The rotation detector 85 is a non-contact type optical sensor. When the device body 2 is in a first device posture illustrated in an upper figure of FIG. 14, the rotary member 65 is spaced apart from the rotation detector 85. When the device body 2 switches from this state to a second device posture illustrated in a lower figure of FIG. 14, the rotary member 65 is brought into a state of overlapping with the rotation detector 85 when viewed from a width direction, thereby changing a detection signal of the rotation detector 85. The control unit 50 (see FIG. 5) can detect a posture of the device body 2 based on the detection signal from the rotation detector 85. Note that, it is needless to say that the rotation detector 85 may be constituted by a contact-type mechanical sensor rather than a non-contact type optical sensor.

As described above, since the configuration is adopted in which, the rotation detector 85, which is a detecting means for detecting rotation of the rotary member 65, is provided, and the rotation of the rotary member 65 is detected by the rotation detector 85 to detect the posture of the device body 2, the posture of the device body 2 can be detected at low cost with simple structure.

Next, a scanner 1E according to a fifth exemplary embodiment will be described with reference to FIG. 16. In the scanner 1E illustrated in FIG. 16, a configuration for performing state switching of the curvature forming unit 43 is the same as the scanner 1A according to the first exemplary embodiment described above. The present exemplary embodiment is different from the scanner 1A according to the first exemplary embodiment described above in that the fixed portion 67 combines a means for detecting a posture of the device body 2.

Specifically, a first detector 87, a second detector 88, and a third detector 89 are provided at intervals at the device body 2 around the rotary shaft 5b (see FIG. 4). The first detector 87, the second detector 88, and the third detector 89 are non-contact type optical sensors. The first detector 87, the second detector 88, the third detector 89, and the fixed portion 67 constitute a posture detector 86. The posture detector 86 is a modified example of the posture detector 80 (see FIG. 11) described above.

Figure 16:
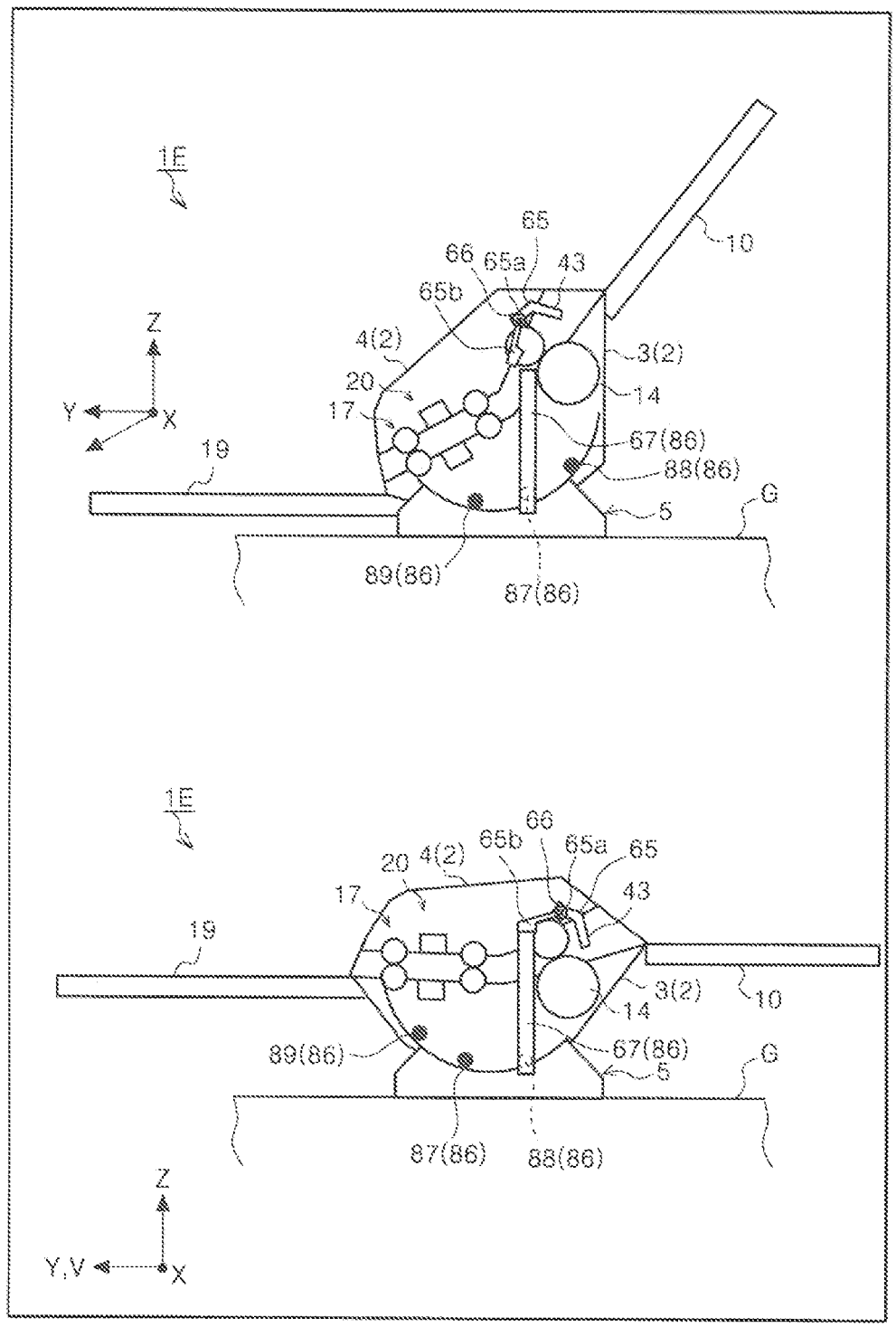
FIG. 16 is a diagram illustrating a configuration in which state switching of a curvature forming unit is performed in a scanner according to a fifth exemplary embodiment.

When the device body 2 is in a first device posture illustrated in an upper figure of FIG. 16, the first detector 87 is at a position overlapping with the fixed portion 67, and the second detector 88 and the third detector 89 are at respective positions outside the fixed portion 67. When the device body 2 switches from this state to a second device posture illustrated in a lower figure of FIG. 16, the second detector 88 overlaps with the fixed portion 67, and the first detector 87 and the third detector 89 are positioned outside the fixed portion 67. Also, although not illustrated, when the device body 2 is switched to a retracted posture (uppermost figure of FIG. 4), the third detector 89 overlaps with the fixed portion 67, and the first detector 87 and the second detector 88 are positioned outside the fixed portion 67. The control unit 50 (see FIG. 5) can detect the posture of the device body 2, based on a detection signal from each of the first detector 87, the second detector 88, and the third detector 89.

It is needless to say that the first detector 87, the second detector 88, and the third detector 89 may each be constituted by a contact-type mechanical sensor rather than a non-contact type optical sensor.

As described above, the configuration is adopted in which, the device body 2 is provided with the plurality of detectors for detecting the fixed portion 67, and any of the plurality of detectors detects the fixed portion 67 in accordance with posture switching of the device body 2 to detect the posture of the device body 2, and thus the posture of the device body 2 can be detected at low cost with simple structure.

Figure 17:
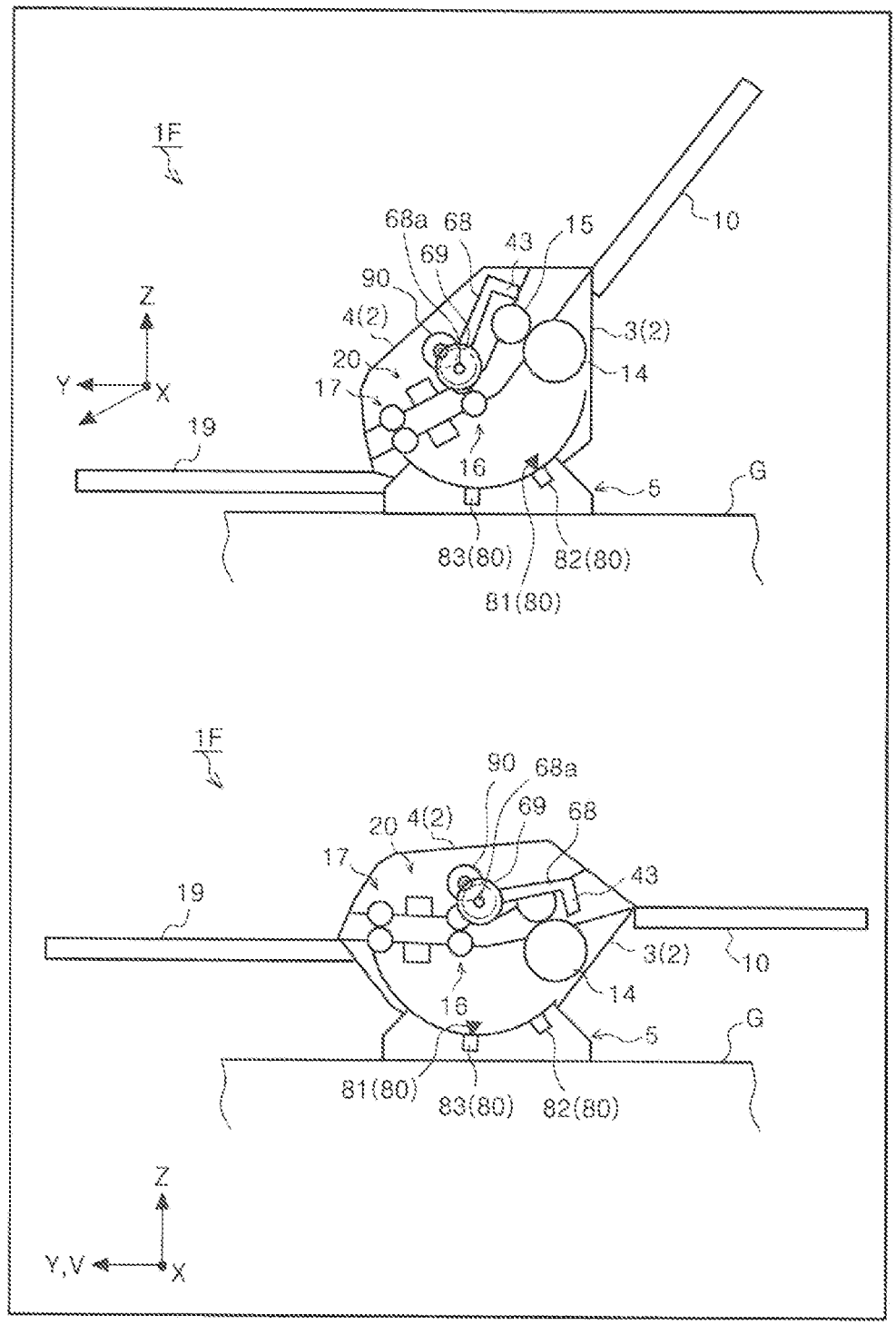
FIG. 17 is a diagram illustrating a configuration in which state switching of a curvature forming unit is performed in a scanner according to a sixth exemplary embodiment.

Next, a scanner 1F according to a sixth exemplary embodiment will be described with reference to FIG. 17. The scanner 1F, similar to the scanner 1B described with reference to FIG. 13, includes the curvature forming unit 43 at the rotary member 68. In the present exemplary embodiment, the rotary member 68 is driven by a motor 90, which is a power source controlled by the control unit 50 (see FIG. 5). In this way, the curvature forming unit 43 is configured to perform state switching by power of the motor 90, and thus a degree of freedom of the state switching of the curvature forming unit 43 is improved.

Next, a scanner 1G according to a seventh exemplary embodiment will be described with reference to FIG. 18 and FIG. 19. A configuration for performing state switching of the curvature forming unit 43 in the scanner 1G is the same as the scanner 1F described with reference to FIG. 17, and the state switching of the curvature forming unit 43 is performed by power of the motor 90.

Figure 18:
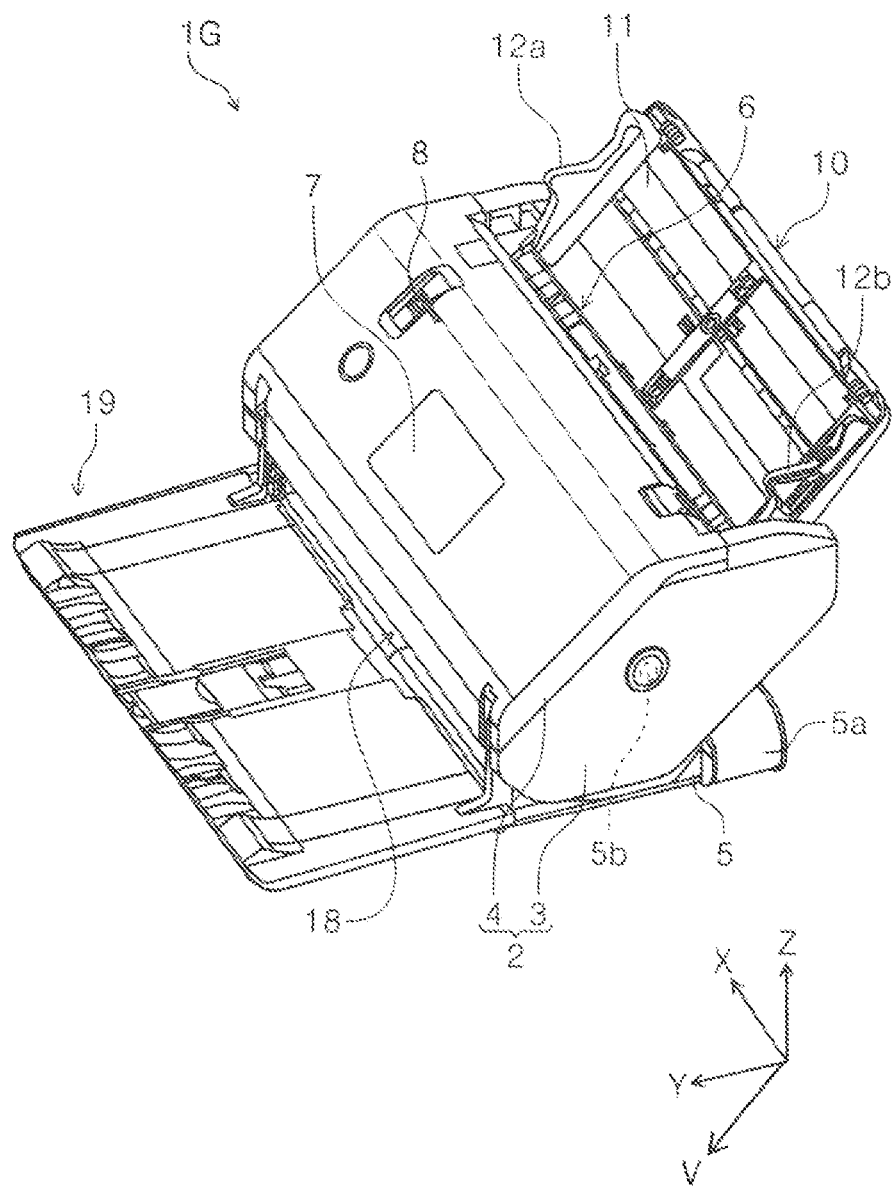
FIG. 18 is an external perspective view of a scanner according to a seventh exemplary embodiment, viewed from a front.

As illustrated in FIG. 18, the scanner 1G according to the present exemplary embodiment is provided with a switching lever 8 for switching a part of separation conditions during manuscript feeding. The switching lever 8 can switch between a "separation position" and a "non-separation position" which is inclined from the separation position in a device depth direction. A position detecting means (not illustrated) for detecting the position of the switching lever 8 is provided at the device body 2, and the control unit 50 can grasp the position of the switching lever 8 based on a detection signal of the position detecting means.

When the switching lever 8 is switched to the non-separation position, a switching mechanism (not illustrated) generates a non-transmission state in which driving force from the separating motor 59 is not transmitted to the separating roller 15. Further, when the switching lever 8 is switched to the non-separation position, the control unit 50 switches the curvature forming unit 43 to a second state when the curvature forming unit 43 is in a first state, and maintains the second state of the curvature forming unit 43 when the curvature forming unit 43 is in the second state.

FIG. 19 summarizes separation conditions defined according to combination of a posture of the device body 2 and a position of the switching lever 8.

When the switching lever 8 is at the separation position, the control unit 50 switches between a first feeding mode and a second feeding mode in accordance with the posture of the device body 2 as described with reference to FIG. 10. When the switching lever 8 is at the separation position, the control unit 50 brings the curvature forming unit 43 into the second state regardless of the posture of the device body 2. In addition, regardless of the posture of the device body 2, pressing force that presses the separating roller 15 to the feeding roller 14 is first pressing force, and the non-transmission state is generated in which driving force from the separating motor 59 is not transmitted to the separating roller 15.

By switching the switching lever 8 to the non-separation position as described above, a manuscript, or the like, prone to a feeding failure can be successfully fed.

Note that, a configuration can be adopted in which the state switching of the curvature forming unit 43 is performed by the switching lever 8. For example, in addition to the "separation position" and "non-separation position" described above as the positions of the switching lever 8, a "delicate separation position" is set. Then, when the switching lever 8 is at the "separation position" or the "non-separation position", the curvature forming unit 43 is brought into the second state, and when at the "delicate separation position", the curvature forming unit 43 is brought into the first state. As a configuration in which the state switching of the curvature forming unit 43 is performed in association with the position switching of the switching lever 8, for example, a configuration can be adopted in which the switching lever 8 and the curvature forming unit 43 are interlocked by a linkage mechanism or the like. Alternatively, in a configuration in which the state switching of the curvature forming unit 43 is performed by the power of the motor 90 as in the exemplary embodiment described with reference to FIG. 16, the motor 90 may be driven in association with the position switching of the switching lever 8.

Further, in the configuration including the switching lever 8, a configuration may be adopted in which the pressing force that presses the separating roller 15 toward the feeding roller 14 is switched in association with an operation of the switching lever 8.

Further, also in such a configuration, in accordance with the posture switching of the device body 2, information related to a method of using the device according to the posture of the device body 2 can be displayed on the operating panel 7 as described above. Examples include a guide "a posture suitable for plain paper or cardboard" displayed when the device body 2 is in a first device posture, and a guide "a posture suitable for thin paper or a manuscript that is prone to damage" displayed when the device body 2 is in a second device posture. Further, as described above, the maximum number of sets of manuscripts suitable for each posture may be displayed.

Additionally, information related to operation of the switching lever 8 in accordance with the posture of the device body 2 can be displayed on the operating panel 7. As an example, an instruction is displayed to switch the switching lever 8 to the non-separation position in order to use a manuscript standby mode when the device body 2 is in the second device posture. The manuscript standby mode is a mode in which a manuscript feeding operation is performed every time a manuscript is placed on the upper surface cover 10 as a manuscript placement unit. By selecting this manuscript standby mode, a user does not need to perform a feeding instruction every time the user sets a manuscript, and a large number of manuscripts can be read continuously without being limited by the maximum value of the number of manuscript sets.

This type of manuscript standby mode is a mode in which manuscripts are set one at a time, and the second device posture is suitable for the device body 2. In addition, since active separation of manuscripts is not performed, the switching lever 8 needs to be switched to the non-separation position. Therefore, when the device body 2 is in the second device posture, it is possible for the user to easily grasp a method of using the device, by displaying, on the operating panel 7, an instruction to switch the switching lever 8 to the non-separation position in order to use the manuscript standby mode.

Note that, the present disclosure is not intended to be limited to the aforementioned exemplary embodiments described above, and many variations are possible within the scope of the disclosure as described in the appended claims. It goes without saying that such variations also fall within the scope of the disclosure.

What is claimed is:

1. An image reader, comprising:
a medium placement unit on which a medium is placed;
a feeding roller configured to contact a surface facing the medium placement unit of the medium placed on the medium placement unit, and rotate to feed the medium;
a separating roller provided at a position facing the feeding roller, and configured to nip the medium together with the feeding roller; and
a reading unit configured to read the medium fed by the feeding roller, wherein
a curvature forming unit configured to contact the medium upstream of a nip position between the feeding roller and the separating roller in a feeding direction of the medium, and to form a curvature in the medium along a width direction intersecting the feeding direction, and
a device body including the medium placement unit, the feeding roller, the separating roller, the reading unit, and the curvature forming unit are provided,
the curvature forming unit is configured to switch between a first state for forming the curvature in the medium, and a second state positioned in a direction retracted from a feeding path of the medium compared to the first state,
the device body is configured to switch between a first device posture, and a second device posture in which a posture of the medium placement unit is closer to a horizontal direction compared to the first device posture, and
the curvature forming unit is associated with posture switching of the device body, is in the second state when the device body takes the first device posture, and is in the first state when the device body takes the second device posture.

2. The image reader according to claim 1, wherein the curvature forming unit is configured to engage with a fixed portion that maintains a fixed state independently of posture switching of the device body, and the curvature forming unit changes engagement with the fixed portion in accordance with posture switching of the device body, and thus the curvature forming unit switches between the first state and the second state.

3. The image reader according to claim 2, wherein
the curvature forming unit is provided at a rotatable rotary member, and is configured to switch between the first state and the second state by the rotary member rotating, and
the rotary member changes engagement with the fixed portion in accordance with posture switching of the device body, and thus the rotary member rotates.

4. The image reader according to claim 3, comprising:
a detecting unit configured to detect rotation of the rotary member, wherein
the detecting unit detects rotation of the rotary member to detect a posture of the device body.

5. The image reader according to claim 2, wherein
the curvature forming unit is provided at a rotatable rotary member, and is configured to switch between the first state and the second state by the rotary member rotating,
the rotary member includes a first toothed gear portion around a center of a rotary shaft,
the fixed portion includes a second toothed gear portion that meshes with the first toothed gear portion,
the first toothed gear portion rotates while moving around the second toothed gear portion in accordance with posture switching of the device body, and thus the rotary member rotates.

6. The image reader according to claim 2, wherein
the device body is provided with a plurality of detectors for detecting the fixed portion, and
any of the plurality of detectors detects the fixed portion in accordance with posture switching of the device body, to detect a posture of the device body.

7. The image reader according to claim 2, comprising:
a support configured to rotatably support the device body, wherein
the fixed portion is fixed to the support.

8. The image reader according to claim 1, wherein
the curvature forming unit is provided at a rotatable rotary member, and is configured to switch between the first state and the second state by the rotary member rotating, and
includes a discharge tray for receiving a medium that is read by the reading unit and discharged,
the discharge tray is rotatably provided with respect to the device body, is associated with a posture change of the device body, takes a first medium supporting posture when the device body takes the first device posture, and takes a second medium supporting posture when the device body takes the second device posture, and
the rotary member is provided so as to be rotatable in association with rotation of the discharge tray.

9. The image reader according to claim 1, wherein
the curvature forming unit receives power from a power source to switch between the first state and the second state.

10. The image reader according to claim 1, comprising:
a display unit configured to display information, wherein
information related to a state of the curvature forming unit is displayed on the display unit in association with posture switching of the device body.

* * * * *